(12) United States Patent
Cantrell, Jr. et al.

(10) Patent No.: US 12,280,956 B1
(45) Date of Patent: Apr. 22, 2025

(54) SYSTEMS AND METHODS FOR CONVEYING OBJECTS

(71) Applicant: Gerald R. Cutler, Bellevue, WA (US)

(72) Inventors: J. Lee Cantrell, Jr., Federal Way, WA (US); Gerald R. Cutler, Bellevue, WA (US); Daniel K. Schrift, Sedro Woolley, WA (US)

(73) Assignee: LOADSTERS INC., Bellevue, WA (US)

( * ) Notice: Subject to any disclaimer, the term of this patent is extended or adjusted under 35 U.S.C. 154(b) by 0 days.

(21) Appl. No.: 17/694,558

(22) Filed: Mar. 14, 2022

Related U.S. Application Data

(60) Provisional application No. 63/160,293, filed on Mar. 12, 2021.

(51) Int. Cl.
*B65G 15/24* (2006.01)
*B65G 21/06* (2006.01)
*B65G 21/14* (2006.01)

(52) U.S. Cl.
CPC ............. *B65G 15/24* (2013.01); *B65G 21/06* (2013.01); *B65G 21/14* (2013.01); *B65G 2207/30* (2013.01)

(58) Field of Classification Search
CPC ........ B65G 15/24; B65G 15/22; B65G 15/26; B65G 21/06; B65G 21/14; B65G 2207/30
See application file for complete search history.

(56) References Cited

U.S. PATENT DOCUMENTS

| | | | | | |
|---|---|---|---|---|---|
| 2,346,659 | A | * | 4/1944 | Bruce | B65G 37/00 198/303 |
| 4,925,009 | A | * | 5/1990 | Hill | B65G 21/06 198/841 |
| 5,096,045 | A | * | 3/1992 | Feldl | B65G 21/06 198/816 |
| 5,609,238 | A | * | 3/1997 | Christensen | B65G 23/44 198/816 |

(Continued)

OTHER PUBLICATIONS

"Bendibelt," Mallaghan, as of Feb. 23, 2020, 6 pages [Retrieved online Sep. 3, 2024 from: mallaghangse.com/portfolio-items/bendibelt].

(Continued)

*Primary Examiner* — Mark A Deuble
(74) *Attorney, Agent, or Firm* — Sheridan Ross P.C.

(57) ABSTRACT

A conveyor assembly for conveying objects includes a first modular conveyor having a first end and a second end, a first conveying system configured for conveying objects from the first end to the second end of the first modular conveyor, and a first connecting interface at the first end of the first modular conveyor; and a second modular conveyor having a first end and a second end, a second conveying system configured for conveying objects from the first end to the second end of the second modular conveyor, and a second connecting interface at the second end of the second modular conveyor, wherein the second end of the first modular conveyor is connectable to the first end of the second modular conveyor conveyance of objects when the second connecting interface of the first modular conveyor is connected to the first connecting interface of the second modular conveyor.

21 Claims, 19 Drawing Sheets

(56) References Cited

U.S. PATENT DOCUMENTS

| | | | | |
|---|---|---|---|---|
| 6,749,191 | B2* | 6/2004 | Pellegrin | B65G 47/268 |
| | | | | 198/833 |
| 7,337,895 | B2* | 3/2008 | De Maeyer | B65G 23/26 |
| | | | | 198/860.2 |
| 10,486,905 | B1 | 11/2019 | Fulton et al. | |
| 11,235,932 | B1* | 2/2022 | Ragan | B65G 47/8876 |
| 2004/0211649 | A1* | 10/2004 | Bonifer | B65G 15/12 |
| | | | | 198/804 |
| 2009/0277753 | A1* | 11/2009 | Violle | B65G 15/24 |
| | | | | 198/586 |
| 2019/0167885 | A1* | 6/2019 | Kelly | A61M 1/16 |
| 2019/0202639 | A1* | 7/2019 | Mukai | B65G 54/02 |
| 2020/0130940 | A1* | 4/2020 | Fulton | B65G 21/14 |

OTHER PUBLICATIONS

"RampSnake Bulk Loader," Aviation Pros, Aug. 10, 2010, 3 pages [Retrieved online Sep. 3, 2024 from: www.aviationpros.com/home/product/10164715/jpt-aerotech-rampsnake-bulk-loader].

"Reducing Costs & Injuries of Ground Handling Operations," Ramper Innovations, as of Feb. 24, 2021, pages [Retrieved online Sep. 3, 2024 from: https://web.archive.org/web/20210224210732/https://ramperinnovations.com/].

"Sliding Carpet Systems," Telair, 2021, 3 pages [Retrieved online Sep. 3, 2024 from: telair.com/portfolio-item/sliding-carpet-systems].

"Versatile Belt Loader Extension," Power Stow, 2021, 8 pages [Retrieved online Sep. 3, 2024 from: https://web.archive.org/web/20210410220804/https://powerstow.com/rollertrack-conveyor/].

* cited by examiner

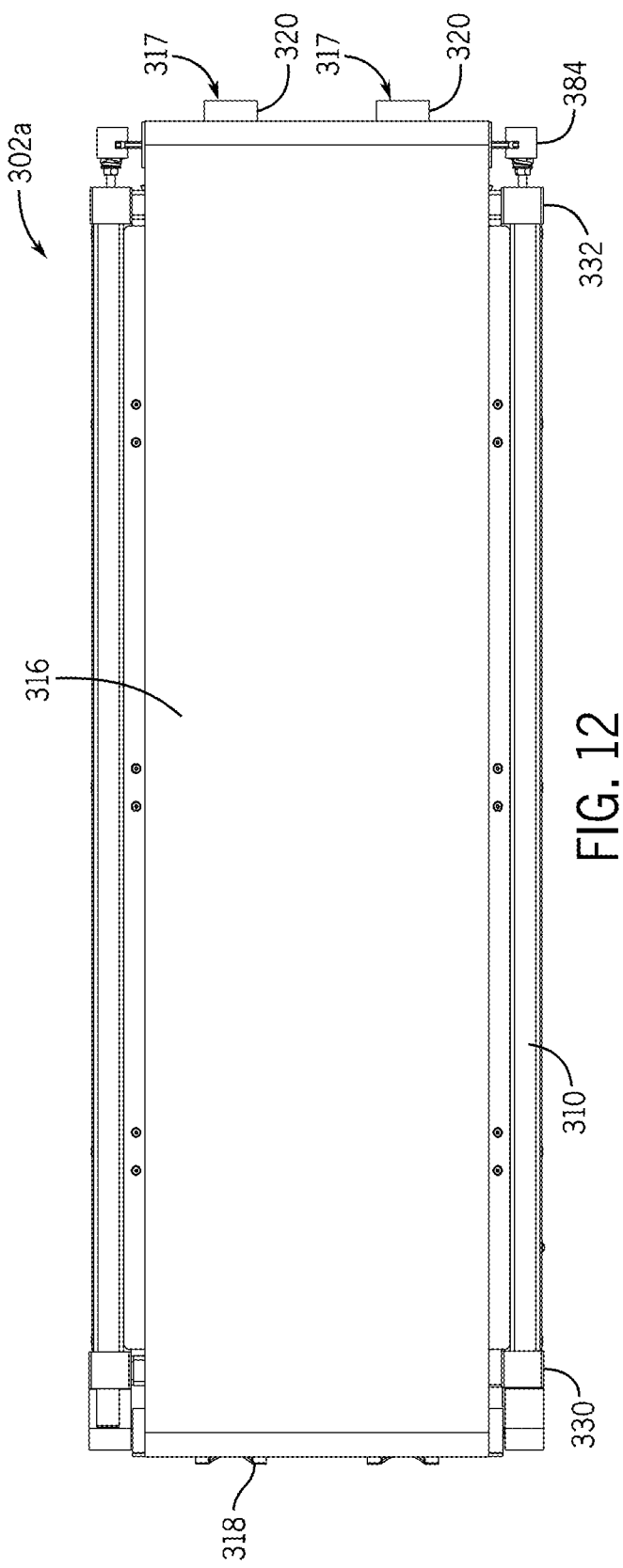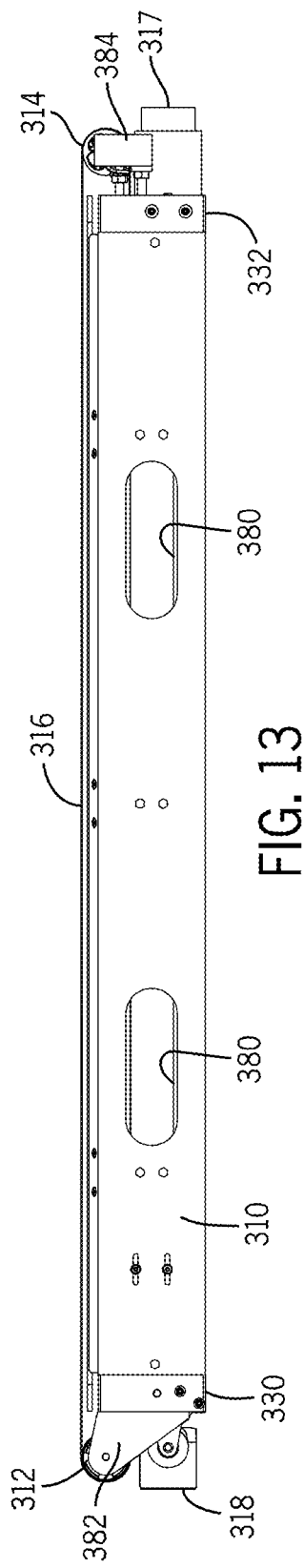
FIG. 12
FIG. 13

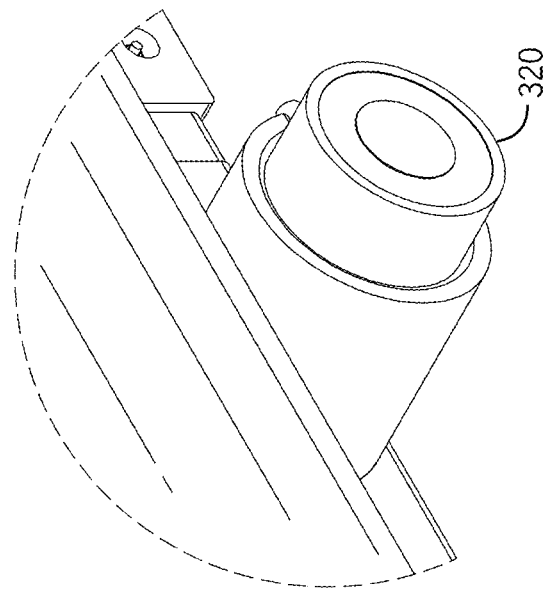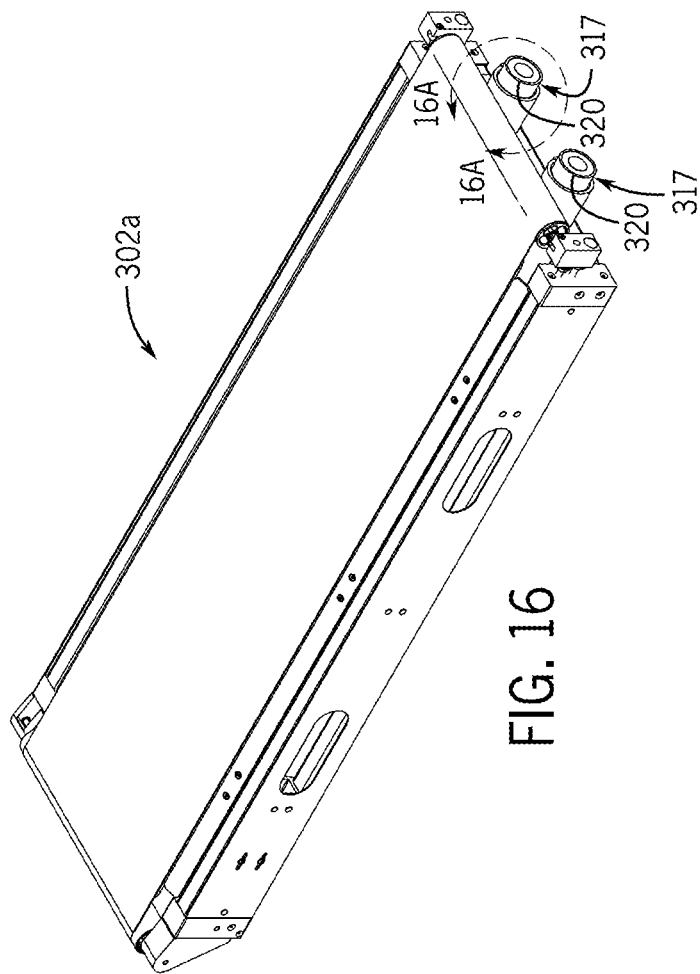

SYSTEMS AND METHODS FOR CONVEYING OBJECTS

CROSS REFERENCE TO RELATED APPLICATION

This application claims the benefit of U.S. Provisional Application No. 63/160,293, filed Mar. 12, 2021, the disclosure of which is hereby expressly incorporated by reference in the present application in its entirety.

BACKGROUND

The bulk loading and unloading of cargo (e.g. baggage, freight, mail, etc.) into, within, and out of the cargo holds of an aircraft is a process requiring manual lifting and moving of items in cramped spaces. Typically, the loading and unloading processes within an aircraft are accomplished by ground service agents (agents) who stage themselves inside the cramped cargo hold of the aircraft. From kneeling and bent over positions, they carry or throw items into predetermined cargo load locations. These load locations are based on cargo weight and load parameters for the aircraft as outlined in an approved loading manual.

Current processes are slow and often cause injury to the agents and damage to the aircraft and the cargo itself. In addition, conveyor systems previously designed as aircraft cargo hold tools tend to be heavy and difficult to maneuver. For these reasons, there is a need for improved systems and processes for loading and unloading into, within, and out of the cargo holds of aircraft.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a conveyor assembly for conveying objects is provided. The conveyor assembly includes: a first modular conveyor having a first end and a second end, a first conveying system configured for conveying objects from the first end to the second end of the first modular conveyor, and a first connecting interface at the first end of the first modular conveyor; and a second modular conveyor having a first end and a second end, a second conveying system configured for conveying objects from the first end to the second end of the second modular conveyor, and a second connecting interface at the second end of the second modular conveyor, wherein the second end of the first modular conveyor is physically connectable to the first end of the second modular conveyor when the second connecting interface of the first modular conveyor is connected to the first connecting interface of the second modular conveyor, and when connected, an object can be conveyed continuously between the first end of the first conveyor to the second end of the second end conveyor, and wherein the second end of the first modular conveyor is physically unconnected to the first end of the second modular conveyor when the second connecting interface of the first modular conveyor is unconnected from the first connecting interface of the second modular conveyor.

In accordance with another embodiment of the present disclosure, a method of conveying objects is provided, The method includes: obtaining a first modular conveyor having a first end and a second end, a first conveying system configured for conveying objects from the first end to the second end of the first modular conveyor, and a first connecting interface at the first end of the first modular conveyor; obtaining a second modular conveyor having a first end and a second end, a second conveying system for conveying objects from the first end to the second end of the second modular conveyor, and a second connecting interface at the second end of the second modular conveyor; releasably coupling the first connecting interface at the first end of the first modular conveyor with the second connecting interface at the second end of the second modular conveyor; and conveying an object between the second end of the first modular conveyor and the first end of the second modular conveyor.

In any of the embodiments described herein, the first and second connecting interfaces may be magnetic, electromagnetic, or mechanical connecting interfaces.

In any of the embodiments described herein, the first and second connecting interfaces, when connected, may provide spacing between adjacent first and second modular conveyors to allow for continuous conveying of an object between the second end of the first conveyor to the first end of the second conveyor.

In any of the embodiments described herein, the control system for the first and second modular conveyors may allow for common electrical control of each of the modular conveyors when the first and second modular conveyors are connected.

In any of the embodiments described herein, each of the first and second modular conveyors may include a conveyor belt and at least first and second rollers.

In any of the embodiments described herein, at least one of the first and second rollers may be a drive roller.

In any of the embodiments described herein, the conveyor assembly may include at least one battery to drive one or more drive rollers in the conveyor assembly.

In any of the embodiments described herein, each of the first and second modular conveyors may include a battery to drive the drive roller.

In any of the embodiments described herein, the first and second modular conveyors may be arranged in a lateral configuration along the conveying axis.

In any of the embodiments described herein, the first and second connecting interfaces may include a connecting interface selecting from the group consisting of a ball and joint socket, a mechanical clamp, and a receiving portion and a received portion.

In any of the embodiments described herein, the first and second connecting interfaces may allow for angled connection such that the second modular conveyor may be angled up to 10, 20, 30, or 45 degrees off the conveying axis of the first modular conveyor.

In any of the embodiments described herein, the angled connection may be in the same plane or in a different plane.

In any of the embodiments described herein, a support surface of each of the modular conveyors may include bearings or bearing surfaces.

In any of the embodiments described herein, the first and second modular conveyors, when unconnected, may be configured to be stackable.

In any of the embodiments described herein, the first and second modular conveyors may be controlled by a master controller located on one of the first and second modular conveyors.

In any of the embodiments described herein, the first and second modular conveyors may be adjacent one another.

In any of the embodiments described herein, the first and second modular conveyors may be separated by a linking unit.

In any of the embodiments described herein, a method may further include disconnecting the first connecting interface at the first end of the first modular conveyor from the second connecting interface at the second end of the second modular conveyor, and assembling the first and second modular conveyors for storage.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 11-15 are various views of a modular conveyor in accordance with other embodiments of the present disclosure.

FIGS. 16-18 are views of other attachment systems between modular conveyors in accordance with embodiments of the present disclosure.

DETAILED DESCRIPTION

Figure 1:
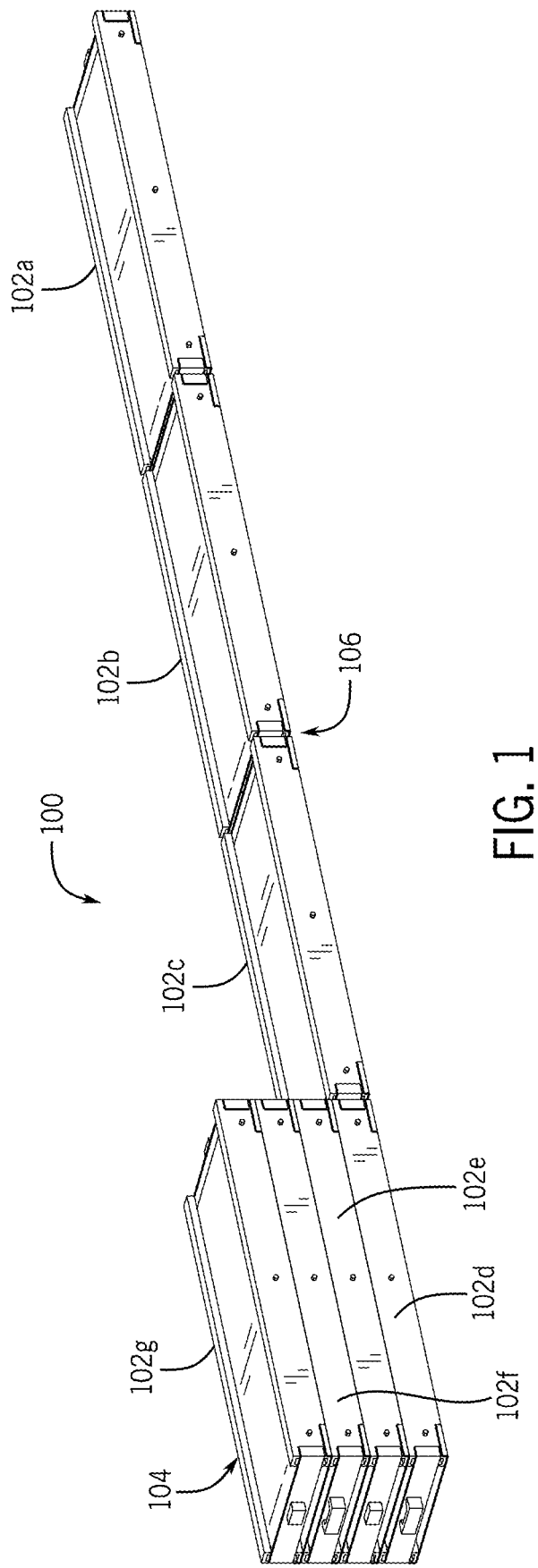
FIG. 1 is an isometric view of a conveyor assembly in accordance with embodiments of the present disclosure having some modular conveyors arranged in a stack configuration and some modular conveyors arranged in an end-to-end elongated configuration.

Embodiments of the present disclosure are directed to systems and methods for conveying objects. Referring to FIG. 1, a conveyor assembly 100 includes a plurality of discrete modular conveyors 102*i* which may be arranged in different configurations (for example, in a stack 104 or in an elongated conveying system 106). Of note, the number 102*i* is used in the present disclosure to represent any of the modular conveyors 102*a*, 102*b*, 102*c*, 102*d*, 102*e*, 102*f*, 102*g* in the conveyor assembly 100 of FIG. 1. Each modular conveyor 102*i* is configured for running a conveying system (such as a conveyor belt 116) to convey objects along a specified distance. When attached in series in an elongated conveying system 106 (as seen in FIG. 1), the modular conveyors 102*a*, 102*b*, 102*c* may be configured to operate in alignment and in a synchronized manner to convey objects along an elongated conveying system 106.

In the present disclosure, orientation language such as top, bottom, lateral, horizontal, vertical, angled, end-to-end, etc., may be used to help the reader navigate the drawings. Such language is for orientation purposes only and is not intended to be limiting.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Referring to FIG. 1, the modular conveyors 102*i* are designed and configured to be detachable from one another to be moved and relocated independently. When detached, the modular conveyors 102*i* may be optionally stacked (for example, in vertical stack 104, or in another type of stack, such as in a collection or recharging station or on a cart (see FIGS. 19A and 19B)) for convenient transport or storage of the conveying system 100.

Although the conveyor assembly 100 of the illustrated embodiment is shown as including seven individual modular conveyors, it should be appreciated that a conveyor assembly 100 in accordance with embodiments of the present disclosure may include any plurality of modular conveyors, for example, 2, 5, 10, 20, etc.

In the illustrated embodiment of a conveyor assembly 100 shown in FIG. 1, a first grouping of the plurality of modular conveyors 102*a*, 102*b*, 102*c* are configured in a lateral arrangement and attached to adjacent modular conveyors 102*i* end-to-end (left to right as seen in FIG. 1). As described in greater detail below, when attached to other modular conveyors end-to-end, the grouping of modular conveyors 102*a*, 102*b*, 102*c* may be configured to operate as a single, elongated conveying system 106. In that regard, the modular conveyors 102*a*, 102*b*, 102*c* are designed and configured for suitable spacing and alignment to be able to operate in a chain as a single, elongated conveying system 106.

A second grouping of the plurality of modular conveyors 102*d*, 102*e*, 102*f*, 102*g* are configured in a stack 104 on top of each other. When stacked, the grouping of modular conveyors 102*d*, 102*e*, 102*f*, 102*g* can be electrically detached from one another and physically detached from their end-to-end coupling. In some embodiments, the stack 104 of modular conveyors may include top and bottom interfaces to ensure that the grouping of stacked modular conveyors 102*d*, 102*e*, 102*f*, 102*g* align properly and to prevent the stack from toppling over.

In the illustrated embodiment, the stack 104 of modular conveyors 102*d*, 102*e*, 102*f*, 102*g* are stacked with each modular conveyor in a horizontal orientation to form a vertical stack 104 of modular conveyors 102*i*. In other embodiments, the stack may be a horizontal stack, an angled stack, or any other orientation that provides a compact assembly of modular conveyors 102*i* that are not being used in an elongated conveying system 106. In the illustrated embodiment, the modular conveyor 102*d* of stack 104 is shown coupled to modular conveyor 102*c*; however, it should be appreciated the stack 104 may be separate from the elongated conveying system 106.

In the illustrated embodiment of FIG. 1, the conveying system 106 is designed and configured to convey along a horizontal plane in a lateral direction in a path that follows a straight line or substantially follows a straight line. In some embodiments of the present disclosure, each individual modular conveyor 102*i* may be configured to be identical to the other modular conveyors in the conveyor assembly 100. In other embodiments, some individual modular conveyors 102*i* may be configured to have some differences, for example, regarding drive capabilities and/or whether a certain modular conveyor 102*i* in an array is a "master" conveyor and other conveyors are "worker" conveyors capable of being controlled by the "master".

In addition, some individual modular conveyors 102*i* may be configured for orientation differences. For example, in some non-limiting examples, some modular conveyors may be designed for chain connections with other modular conveyors in meandering, perpendicular, and/or angled directions relative to a lateral direction to navigate corners or bends in the travel path. In other non-limiting examples, some modular conveyors may be designed for vertically inclined or declined configurations to navigate changes in elevation in the travel path.

In other configurations, the individual modular conveyors 102*i* may include spacer modules between adjacent conveyors 102*i*, for example, non-powered roller modules between adjacent powered conveyors 102*i*, as described in greater detail below.

Referring to FIGS. 2-6, the features of an individual modular conveyor 102*a* will now be described. As seen in the illustrated embodiment of FIGS. 2-6, each modular conveyor 102*a*, 102*b*, 102*c* includes a frame 110, a conveying system (shown in FIGS. 2-6 as including a roller assembly 108 and a conveyor belt 116), and first and second lateral attachment interfaces 118 and 120 (shown as respective left and right lateral attachment interfaces for each conveyor 102*a*, 102*b*, 102*c* in the illustrated embodiment of FIGS. 2 and 3) for attaching to other adjacent modular conveyors 102*i*. Together, the first and second lateral attachment interfaces 118 and 120, for example, of the first and second conveyors 102*a* and 102*b* define a combined lateral attachment interface 117. In addition, each modular conveyor 102*i* may also include an optional battery 160 (see FIG. 6) and electrical circuitry (not shown).

Conveying systems are mechanical devices or assemblies that are designed for efficient transport of objects or material. While the conveying system of the illustrated embodiment includes a roller assembly 108 and a conveyor belt 116, other conveying systems are within the scope of the present disclosure. For example, the conveying system may include a plurality of rollers or wheels in lieu of a conveyor belt, or other suitable conveying systems known in the art.

Figure 2:
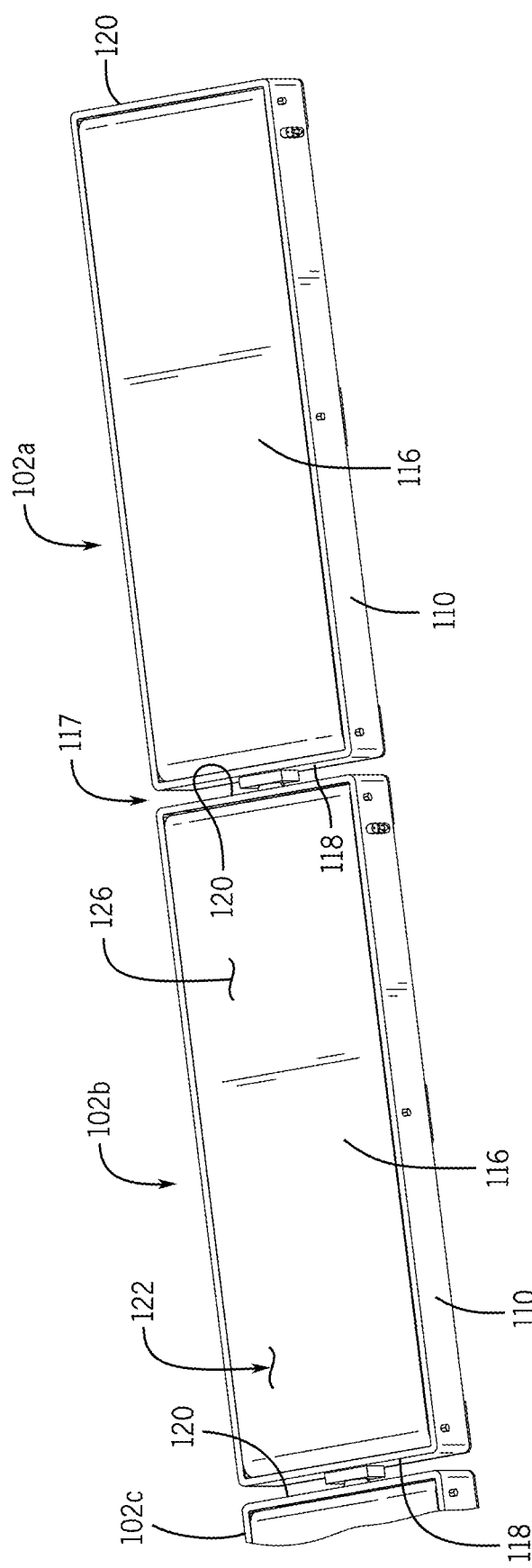
FIG. 2 is an isometric top view of a portion of the conveyor assembly of FIG. 1.
Figure 3:
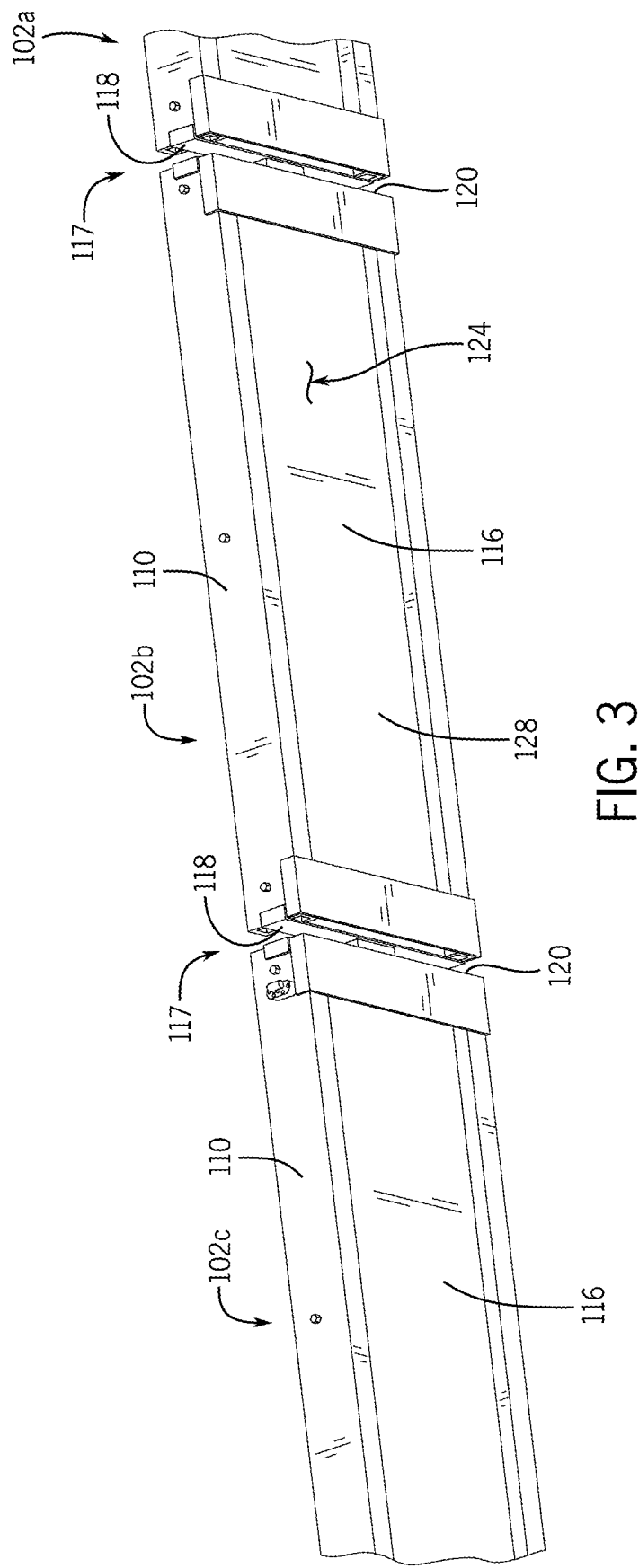
FIG. 3 is an isometric bottom view of a portion of the conveyor assembly of FIG. 1.

In the illustrated embodiment, a top portion 122 of the modular conveyor 102*b* is shown in FIG. 2 and a bottom portion 124 of the modular conveyor 102*b* is shown in FIG. 3. The top portion 122 of the modular conveyor 102*b* includes a conveying portion 126 of the conveyor belt 116, which is a portion of the exposed conveyor belt 116 upon which objects may be conveyed.

The bottom portion 124 of the modular conveyor 102*b* may be designed and configured to interface with a support surface (such as a floor or ground surface, not shown) and to protect the unexposed, non-conveying portion 128 of the conveyor belt 116 and any other internal components of the modular conveyor 102b (such as rollers 112, 114, 115, battery 160, etc.) disposed within the frame 110.

Because the conveyor belt 116 may be in motion, the conveying and non-conveying portions 126 and 128 of the conveyor belt 116 may be constantly in motion.

Figure 4:
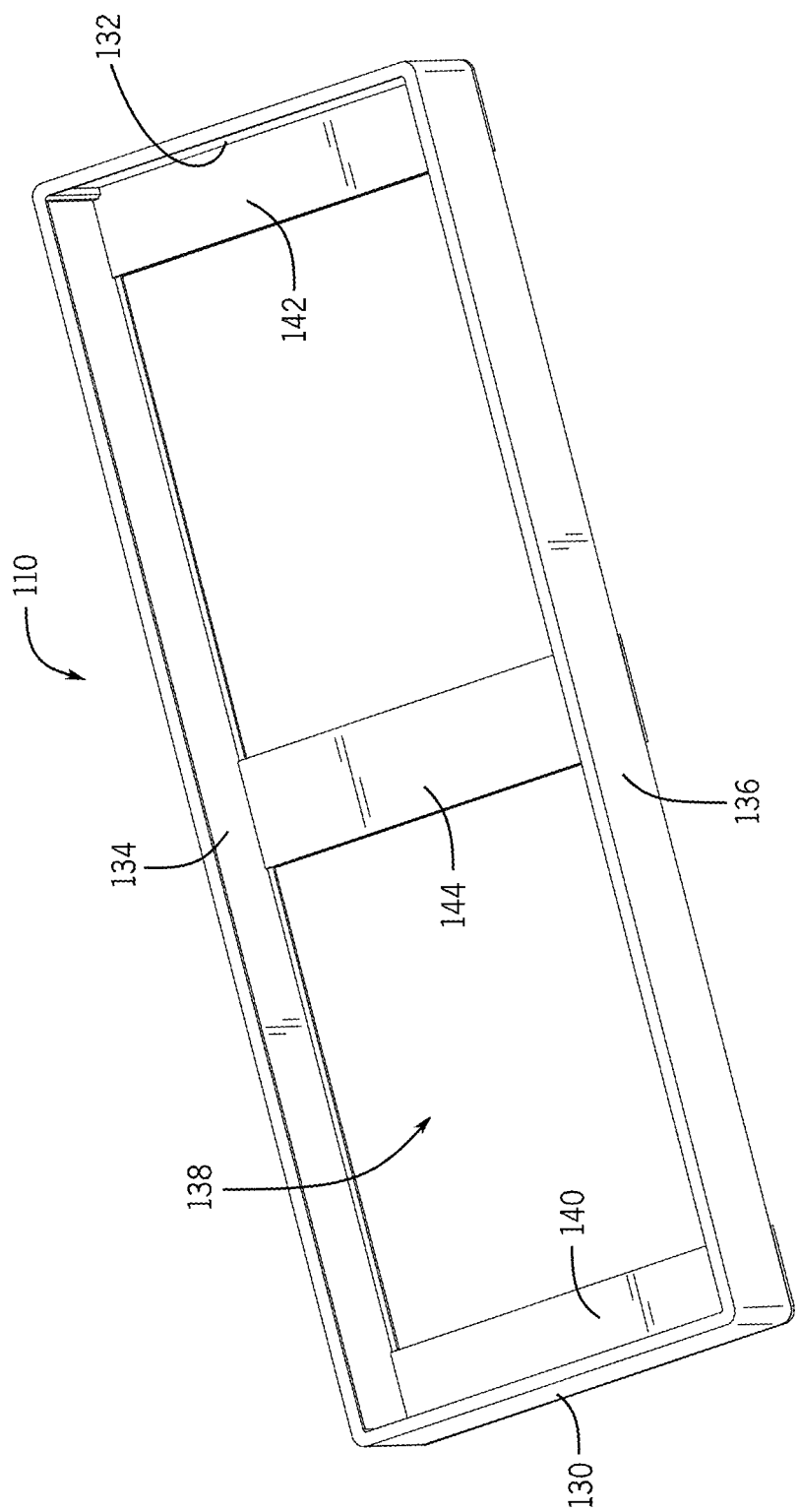
FIG. 4 is an isometric top view of a frame portion of a modular conveyor in accordance with embodiments of the present disclosure.

Referring to FIG. 4, the frame 110 is designed and configured to house the conveying system, shown as the roller assembly 108 and the conveyor belt 116. In the illustrated embodiment of FIG. 4, the frame 110 includes a plurality of walls to define such housing. For example, the frame 110 includes a first end wall 130, a second end wall 132 opposite the first end wall 130, a first side wall 134, and a second side wall 136 opposite the first side wall 134. The walls 130, 132, 134, 136 may be coupled to one another or integrally formed to define an interior void 138. Internal components of the modular conveyor 102b (such as the roller assembly 108 and the conveyor belt 116) may be disposed within the interior void 138 of the frame 110.

In an alternate embodiment, each modular conveyor 102i may include a separate housing portion, which may be secured to the interior surface of the frame, for example, for housing internal components such as the battery 160 and/or electric circuitry (not shown).

In accordance with embodiments described herein, the frame 110 may be a made from any suitable materials including plastics, metals, fiberglass, etc., or any combination thereof. In one embodiment, the frame 110 is molded from a light weight plastic for durability, ease of use, and ease of stacking. When molded from plastic, electrical wiring may be embedded in one or more of the walls of the frame 100 of each modular conveyor 102i during the molding process.

As described above, the bottom portion 124 of the modular conveyor 102b may be designed and configured to interface with a support surface (such as a floor or ground surface, not shown). In that regard, the frame 110 may be designed and configured to optionally include additional walls or bottom panels to provide further protection for the unexposed, non-conveying portion 128 of the conveyor belt 116 and other internal components of the modular conveyor 102b.

In the illustrated embodiment of FIG. 4, the frame 110 includes three support panels 140, 142, 144 defining bottom portions of the modular conveyor 102b. In the illustrated embodiment, the first and second support panels 140 and 142 are located near first and second end walls 130 and 132, and the third support panel 144 is located between the first and second end walls 130 and 132. The support panels 140, 142, 144 align with rollers 112, 114, 115 in the roller system to protect the rollers from damage (see FIG. 5).

Although shown as three separate support panels 140, 142, 144 in the illustrated embodiment of FIG. 4, any number of support panels and one continuous support panel are both within the scope of the present disclosure. For example, in another embodiment, the frame 110 may include a one or more support panels covering the entire bottom portion 124 of the modular conveyor 102b.

Each modular conveyor 102i may be configured for movability on a support surface (such as a floor or ground surface) on which it is disposed and/or for movability with reference to other modular conveyors in the stack 104. In some embodiments, the frame 110 may include bearings, such as bearing surfaces or casters. In the illustrated embodiment of FIG. 3, the frame 110 includes bearing surfaces on the bottom portion 124 to allow for the frame 110 to be slidable, for example, on the floor of the aircraft or in relation to other modular conveyors 102i in the stack 104.

Bearing surfaces may be attached to or integrally formed within the frame 110. For example, in the illustrated embodiment, support panels 140, 142, 144 may be made from bearing materials and/or coating with bearing materials.

In some embodiments of the present disclosure, suitable materials for such bearing surfaces may include bearing plastics and/or bearing metals, such as nylon, polyether ether ketone (PEEK), polyoxymethylene, polytetrafluoroethylene (PTFE), ultra-high-molecular-weight polyethylene (UHMWPE), steel, aluminum, bronze, etc. In other embodiments, the modular conveyor may include casters attached to or embedded in the frame for such movability.

In the illustrated embodiment, the top and bottom portions 122 and 124 of the modular conveyor 102b are distinctly different, with the top portion 122 designed for exposing the conveying portion 126 of the conveyor belt 116 of the modular conveyor 102b, and the bottom portion 124 designed for providing a support surface and protecting the non-conveying portion 128 of the conveyor belt 116 and other internal components of the modular conveyor 102b. However, in other embodiments, modular conveyors may be configured to be reversible with no distinct top and bottom portions. For example, the conveyor belt 116 may be exposed on both top and bottom portions 122 and 124, such that either the top portion 122 or the bottom portion 124 can be a conveying portion of the conveyor belt 116.

Referring to FIGS. 2 and 3, the conveyor belt 116 may be aligned within the frame such that the conveyor belt 116 travels close to the side walls 134 and 136 of the frame 110 to prevent luggage or other items from getting caught in the space between the belt and the side walls 134 and 136 of the frame 110. However, the side wall alignment is designed to prevent the conveyor belt 116 from rubbing against the side walls of the frame 110.

Likewise, the roller assembly 108 on which the conveyor belt 116 travels (described in greater detail below), may be aligned within the frame such that the conveyor belt 116 travels close to the end walls 130 and 132 of the frame 110 to prevent luggage or other items from getting caught in the space between the belt and the end walls 130 and 132 of the frame 110. Similar to the side wall alignment, the end wall alignment is designed to prevent the conveyor belt 116 from rubbing against the end walls of the frame 110.

Alternatively, the frame 110 may be designed and configured to include a top collar 162 (see, e.g., FIG. 7) and/or a bottom collar (not shown) extending perpendicular from at least one of the walls to prevent luggage or other items from getting caught in the space between the belt and the at least one of the walls.

In the illustrated embodiment, the frame walls 130, 132, 134, 136 of each modular conveyor 102b are flush with the belt or slightly lower than the belt. Such end wall height allows objects to transition between adjacent modular conveyors 102i arranged end-to-end. The spacing between the first and second rollers 112 and 114 on adjacent modular conveyors 102a and 102b (see FIG. 7) and the spacing between adjacent conveyor belts 116 on adjacent modular conveyors 102a and 102b may be designed such that an object to be conveyed may span across and be disposed on both conveyors for transitioning from one conveyor to the other.

Further, such side wall height allows objects that may be wider than the width of the conveyor belt 116 to be transported by the modular conveyor 102i without creating a pinch point or stop between the two side walls.

In other embodiments, for example, in the transport of small objects smaller than the width of the conveyor belt 116, the frame side walls 134 and 136 may extend higher than the conveyor belt 116 to provide side guards and prevent smaller items from falling off the edges of the conveyor belt. In an alternate embodiment (see FIG. 13), the roller assembly may be configured such that the conveyor belt travels above the frame.

Figure 5:
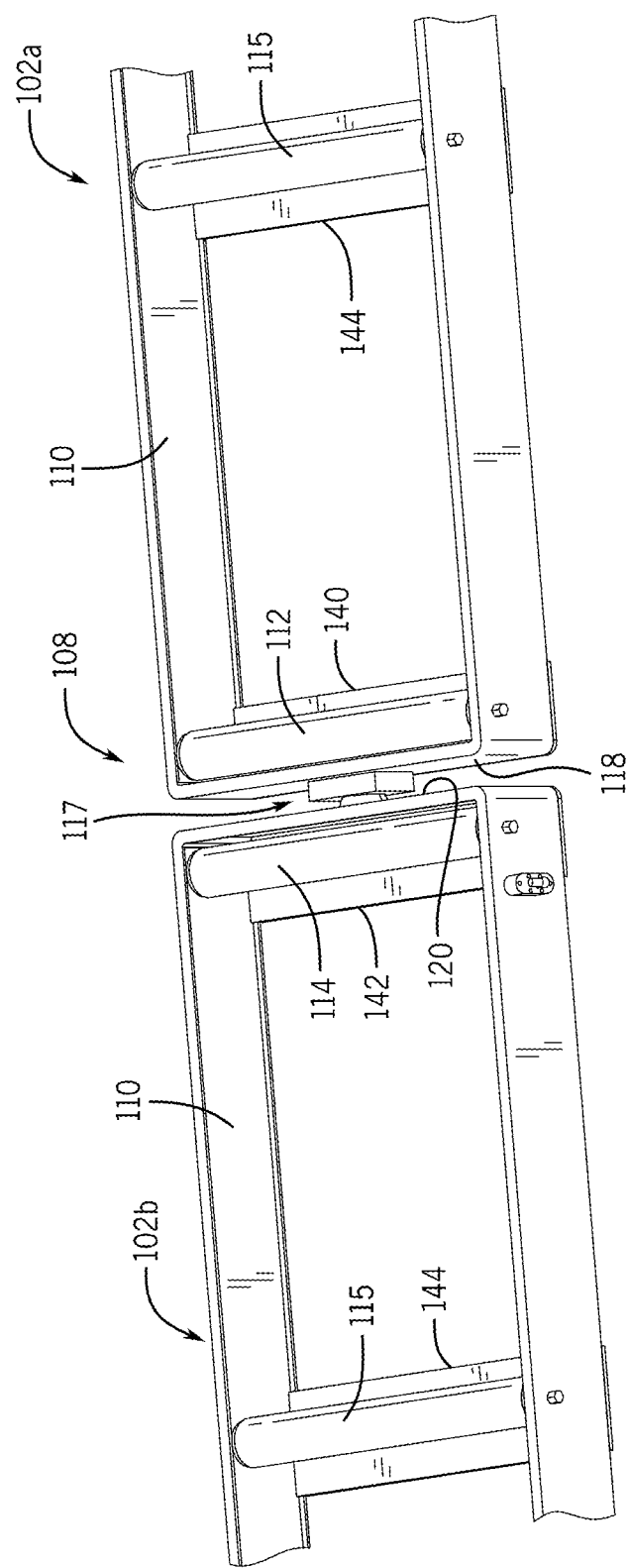
FIGS. 5 and 6 are isometric views of rollers in a roller assembly of a modular conveyor in accordance with embodiments of the present disclosure.
Figure 6:
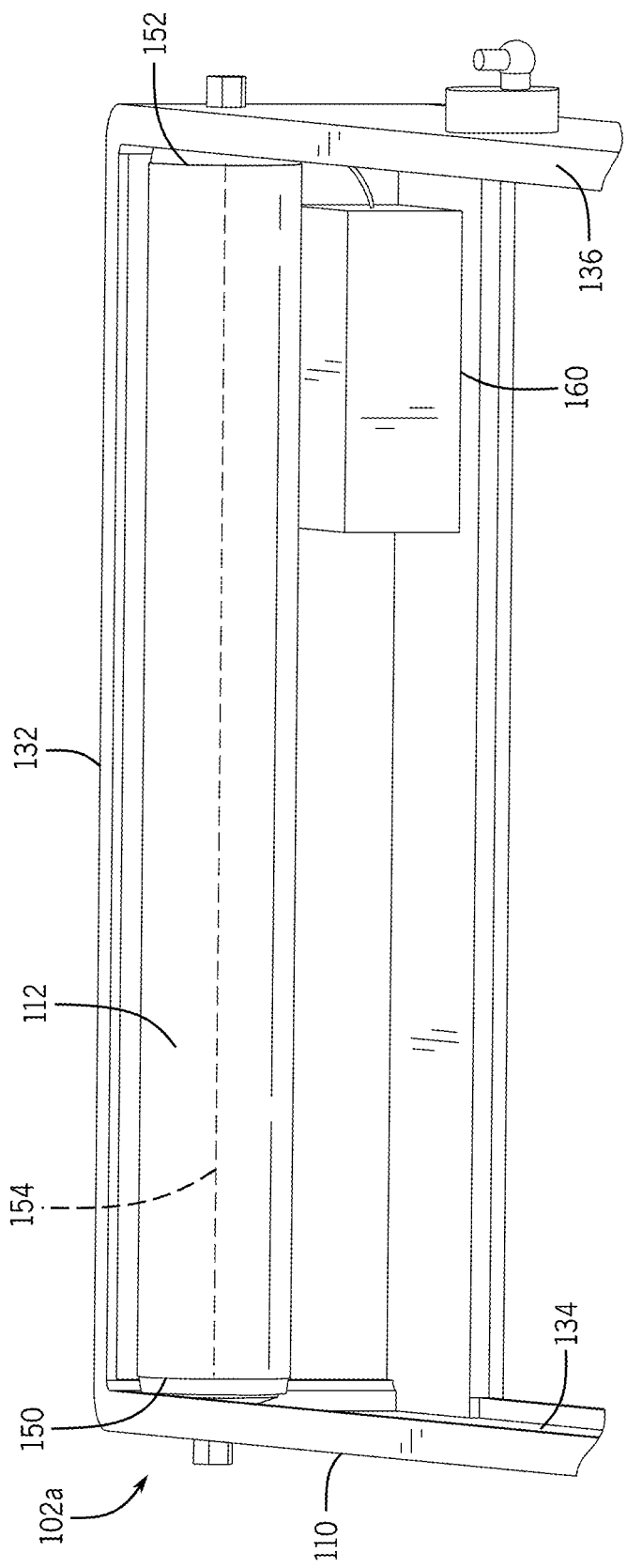
Figure 7:
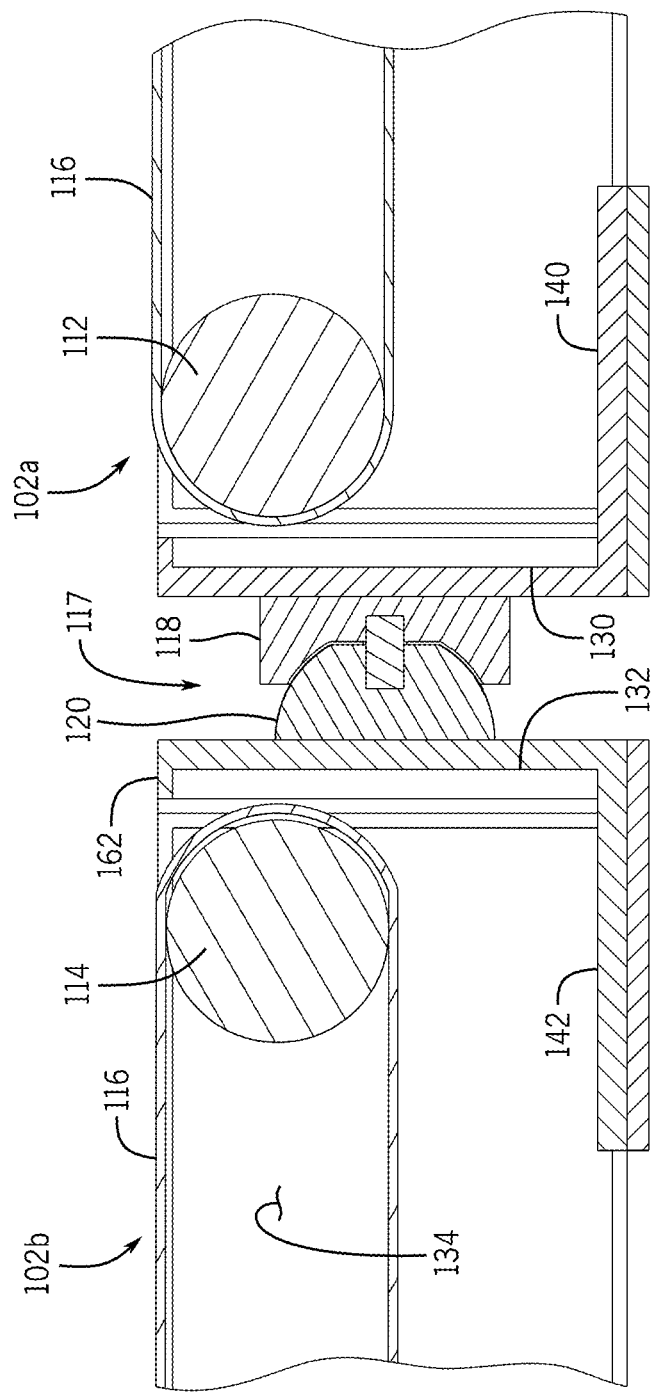
FIGS. 7, 8A, and 8B are cross-sectional and isometric views of an attachment interface between adjacent modular conveyors in a conveyor assembly in accordance with embodiments of the present disclosure.

Referring now to FIGS. 5-7, the roller assembly 108 to support the conveyor belt 116 will now be described. In the illustrated embodiment, the roller assembly 108 includes two end rollers 112, 114 disposed within the interior void 138 of the frame 110. However, the roller assembly 108 may be designed and configured to include more than two rollers. In the illustrated embodiment, a third intermediate roller 115 may be included in the roller assembly 108 (see FIG. 5), for example, for tensioning the conveyor belt, 116 as described in greater detail below.

Referring to FIG. 6, each of end rollers 112 and 114 has a first end and a second end 150 and 152, and a longitudinal axis 154 extending between the first end 150 and a second end 152. Each roller 112 is configured to rotate about the longitudinal axis. In the illustrated embodiment, the first end 150 of roller 112 is attached to the first side wall 134 of the frame 110 of the modular conveyor 102a and the second end 152 of roller 112 is attached to the second side wall 136 of the frame 110 of the modular conveyor 102a.

The end rollers 112 and 114 are located within the frame near end walls 130 and 132 to minimize the gap between the conveyor belt 116 and the end walls 130 and 132, but also to minimize interference of rubbing of the conveyor belt 116 against the end walls 130 and 132 when the conveyor belt 116 is in motion. As seen in FIGS. 5-7, the first roller 112 is attached to the first and second side walls 136 and 136 at a location proximal to the first end wall 130 of the frame 110, and the second roller 114 is attached to the first and second side walls 136 and 136 at a location proximal to the second end wall 132 of the frame 110.

In general, a belt conveyor system includes of two or more pulleys (described herein as end rollers 112 and 114), with a closed loop conveyor belt 116 for carrying medium that rotates about the pulleys. As described in detail below, one or both of the pulleys are drive pulleys, moving the belt and the material on the belt forward. Therefore, when in operation, as the rollers 112 and 114 rotate, the conveyor belt 116 moves with the rollers 112 and 114 (see FIG. 7).

Returning to FIG. 5, the third intermediate roller 115 may be an optional assist roller or a tensioning roller. As an assist roller, the third intermediate roller 115 may help to maintain proper rotation and movement of the conveyor belt around the first and second end rollers 112 and 114. As a tensioning roller, the third intermediate roller 115 may be adjustable in its connection to the side walls 134 and 136. As the conveyor belt 116 extends in length over time as a result of use, the third intermediate roller 115 can be adjusted to re-tension the conveyor belt 116 to is proper tensioning for optimal conveying results. In other embodiments, other conveyor belt tensioning devices known in the industry in addition to or besides a third roller 115 may be employed.

Similar to intermediate roller 115, the attachment of the first and/or second rollers 110 and/or 112 to the first and second side walls 136 and 136 of the frame 110 may be an adjustable attachment for tensioning the conveyor belt 116.

As mentioned above, one or more of the rollers 112 or 114 in the roller assembly 108 may be drive rollers. Drive rollers rotate via direct interaction with a motor. Internal electric motors power motorized drive rollers (MDR). Belt-driven drive rollers receive rotational energy from linked motors. Other drive systems are within the scope of the present disclosure, such as chain or shaft driven rollers.

In contrast, idler rollers do not receive direct mechanical input from a power source, though they may be linked into a transmission, for example, via a drive belt or the conveyor belt. Idler rollers support conveyed materials between drive rollers and can also be used to maintain or adjust tension in a transmission.

For example, in one embodiment of the present disclosure, at least one or the rollers 112 or 114 in the roller assembly 108 is a drive roller driven by a motor, which may be internal to the roller or linked to the roller. The motor may be powered by a battery or an electrical connection. The idler rollers in the system rotate with the conveyor belts as it is rotated by the drive roller.

In the case of a battery-powered drive roller, referring to FIG. 6, a battery 160 may be secured to the interior surface of the frame 110 of a modular conveyor 102a. Suitable batteries may include lithium ion (Li-ion) or nickel metal hydride (NiMH) batteries, or any other suitable battery known in the art.

Each modular conveyor 102i in the conveyor assembly 100 may not require its own battery or independent electrical connect with an external power source. In some embodiments, power may be supplied via the electrical connection at the combined attachment interface 117 between adjacent modular conveyors 102i. For example, the power supply (such as a battery or an electrical power supply) may be coupled to one or more of the modular conveyors 102i in the conveyor assembly 100, but not all modular conveyors 102i in the conveyor assembly 100. In another embodiment, the series of modular conveyors 102i in the conveyor assembly 100 may be powered by a separate battery power source, such as a battery associated with another modular conveyor 102i in the series or a portable battery unit. In another embodiment, the series of modular conveyors 102i in the conveyor assembly 100 may be powered by an electrical connection.

The conveyor belt 116 in each of the modular conveyors 102i will now be described. The conveyor belt 116 is a continuous closed loop belt that is looped around the roller assembly 108 to allow the rollers to turn the conveyor belt 116 for conveying objects along the conveying portion 126 of each modular conveyor 102i. The conveyor belt 116 may be made from any suitable material for transporting luggage, such as steel, polyester, nylon, cotton, aramid, rubber, plastic, or a combination thereof.

Figure 8A:
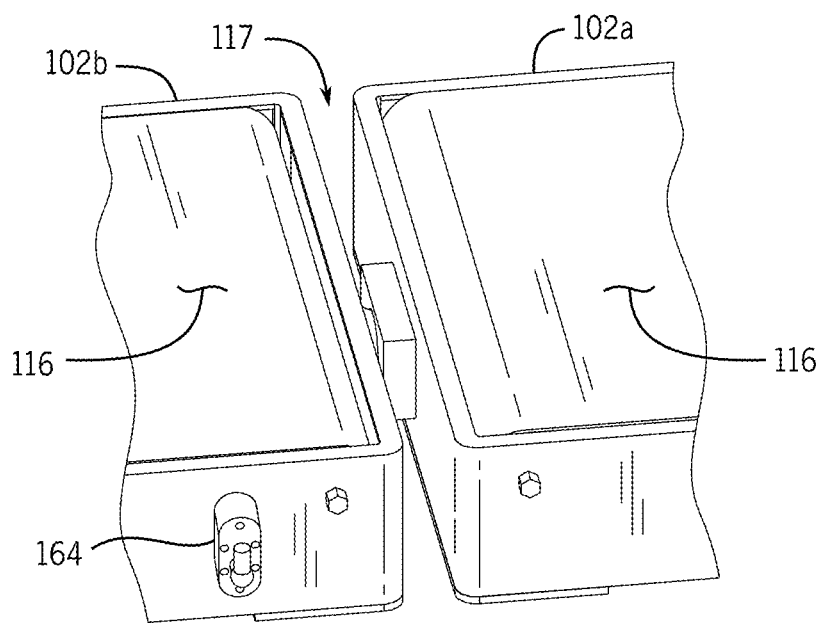
Figure 8B:
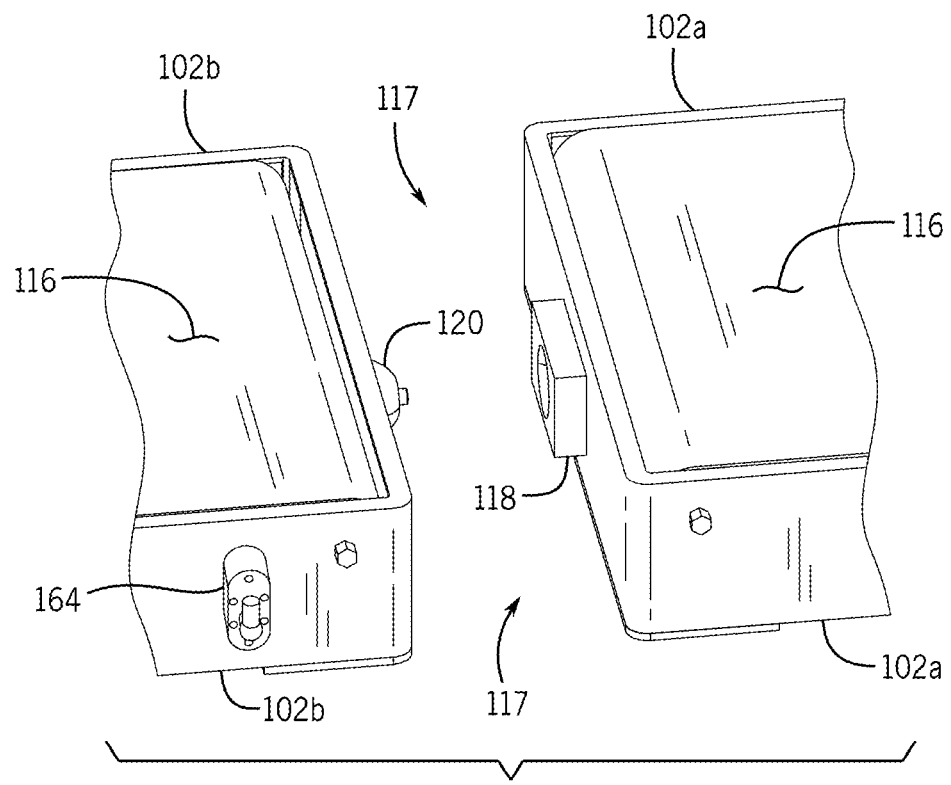

With reference to FIGS. 7-8B, attachment between adjacent conveyor modules 102i will now be described. As described above, each of the modular conveyors 102i includes a first lateral attachment interface 118 on an exterior surface of the first frame end wall 130 and a second lateral attachment interface 120 on an exterior surface of the second frame end wall 132. Together, the first and second lateral attachment interfaces 118 and 120 of the first and second conveyors 102a and 102b define a combined lateral attachment interface 117.

The first and second lateral attachment interfaces 118 or 120 may be universal interfaces or specific interfaces designed for directionality. For example, as seen in the illustrated embodiment, the first attachment interface 118 may be a female mating interface and the second attachment interface 120 may be a male mating interface, to allow for directional mating. As seen in the illustrated embodiment of FIG. 7, the combined lateral attachment interface 117 includes a ball and joint socket interface to allow for a rotational movement of one modular conveyor 102i relative to another 102i. Such rotational movement may allow the modular conveyors 102i to be positioned at an angle relative to an adjacent modular conveyor 102i, allowing a series of connected modular conveyors 102i to meander around objects or corners when needed. Such rotational movement may also allow for inclined or declined positioning relative to other modular conveyors 102i in the series. In non-limiting examples, the interface 117 may allow for rotation of up to 10, 20, 30, or 45 degrees of one module conveyor 102i relative to another.

In one embodiment, the combined lateral attachment assembly 117 may include magnets, such as permanent magnets or electromagnets. For example, each modular conveyor 102i may include a first magnet in the first lateral attachment interface 118 and a second magnet in the second lateral attachment interface 120. Alternatively, each modular conveyor 102i may include a first magnet in one of the first and second lateral attachment interfaces 118 and 120 and a material capable of carrying a magnetic current in the other of the first and second lateral attachment interfaces 118 and 120. Other non-magnetic attachment assemblies 117 for quick connect besides magnets are also within the scope of present disclosure, such as snap fit connection.

Alternatively, electromagnets in the combined lateral attachment assembly 117 may require a power source to initiate the coupling. When an electric charge is passed through the electromagnets, the electromagnets behave like a magnet and allow the modular conveyors 102i to be coupled end-to-end. When the electric charge is removed, the electromagnets cease to behave like a magnet. Electromagnets allow for an extra degree of safety when compared to permanent magnets, which could snap together and injure a user when the modular conveyors are brought into proximity of each other.

The magnets (whether permanent magnets or electromagnets) are designed and configured with designed magnetic field and magnetic strength. Suitable magnetic strength will be determined by the weight and expected loads of the individual modular conveyors 102i to ensure that the modular conveyors 102i stay connected when operating as an elongated conveying system 106. The magnetic field and strength of a permanent magnet depends on the material used for the magnet. For an electromagnet, the magnetic field is created by a wire-wound coil; the strength of electromagnet varies according to the flow of electric current into it.

In the case of an electromagnet, the magnetic field can be controlled by an ON/OFF switch 164 (see FIGS. 8A and 8B) that may be located on each individual modular conveyor 102i. When the switch is in the OFF position, there will be no magnetic attraction between the first and second lateral attachment interfaces 118 and 120. When the switch is turned ON, the magnetic field is initiated to its designed magnetic strength. Such a switch may include a safety latch that ensures the first and second lateral attachment interfaces 118 and 120 are in proper positioning before magnetic attraction can be initiated. Such safety latch is designed to prevent operator pinch injury when adjacent modular conveyors 102i are close to being in position, but not exactly aligned, such that when magnetic attraction is initiated, one of the modular conveyors 102i snaps into position.

In addition to the ON/OFF switch for an electromagnet, the electric circuitry of each modular conveyor 102i may be configured to turn on or off, to control the variable speed, or to control the conveyance direction of the roller assembly 108. In one method of operation, when several modular conveyors 102i are connected in a series, each modular conveyor 102i may be controlled individually.

In addition to a design for the individual control of discrete modular conveyers 102i, an elongated conveying system 106 may be designed with a "master" controller to turn the entire magnetic connection of the series ON or OFF with a "master" switch and/or to control the speed of the roller assembly 108. For example, the electric circuitry may connect each modular conveyor 102i to adjoining modular conveyors 102i in a chain, through the respective first and second lateral attachment interfaces 118 and 120, to allow all the modular conveyors in the chain to be turned on and/or turned off simultaneously or to adjust the speed of all the modular conveyors when one modular conveyor 102i is controlled. In such an embodiment, one of the modular conveyors 102i (the "master" modular conveyor) may be designed to control all of the modular conveyors 102i in the chain. In other embodiments, the control system for conveyor assemblies may be designed with a wireless connection to coordinate control of the individual modular conveyors 102i. Exemplary wireless connections may include custom protocols, Bluetooth WiFi, Zigbee, or others. In embodiments of the present disclosure, a conveyor assembly may be designed such that the entire assembly is controlled by a master modular conveyor.

In another embodiment, each modular conveyor 102i may be capable of being the "master" modular conveyor and controlling all of the modular conveyors 102i in the chain. Such design would provide a safety mechanism for agents who might need to deactivate the elongated conveying system 106 from a located away from a designated "master" modular conveyor.

The electric circuitry of each modular conveyor 102i may be configured to connect the roller assembly 108 and an electromagnetic interface to the battery 160.

Figure 9:
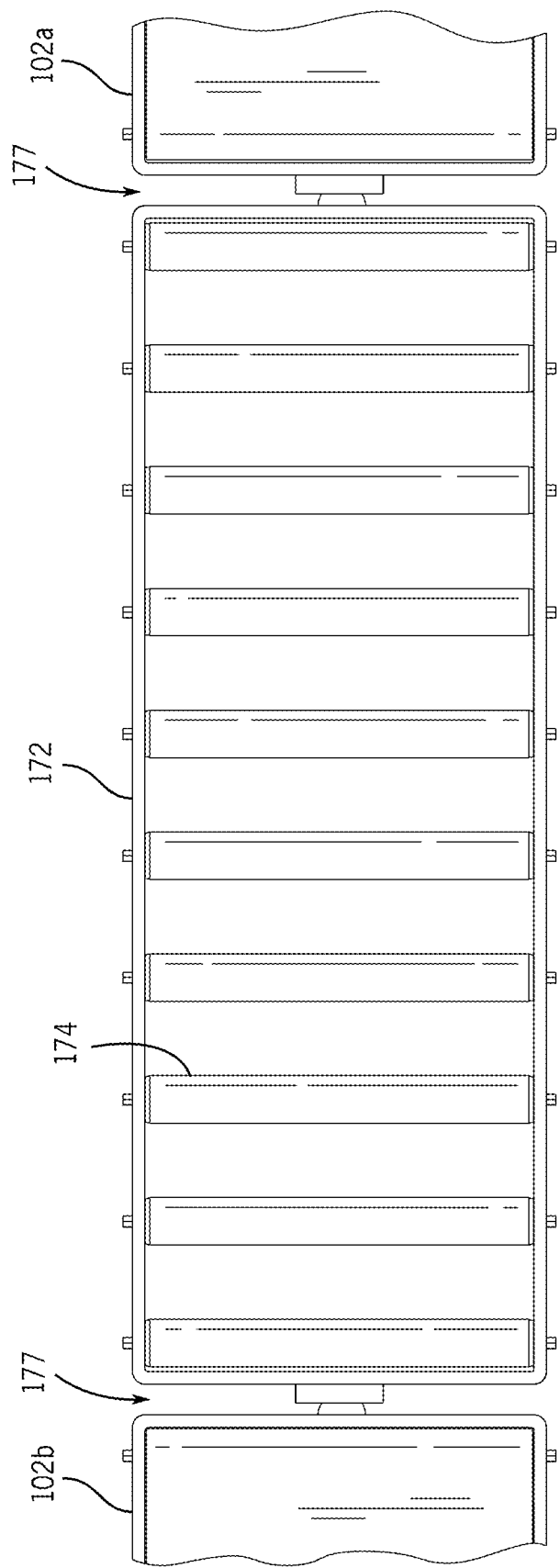
FIG. 9 is a top view of an embodiment of a conveyance assembly including a linking module between two modular conveyors in accordance with embodiments of the present disclosure.

Referring to FIG. 9, in another embodiment of the present disclosure, modular conveyors 102i configured in series need not be in direct succession after one another and may be adjoined by a linking module 172. A linking module 172 may be a passive conveyor disposed between modular conveyors 102i enabling physical and electrical connection between two conveyors 102a and 102b. The linking module 172 may be, for example, a series of rollers 174 that allow the objects being conveyed to continue to travel (for example, by being pushed by other objects), without actively conveying the objects. The linking module 172 may have suitable attachment interfaces 177 to be physically joined in succession modular conveyors 102i. When attached to other modular conveyors 102i, the linking module 172 may provide electrical coupling between two connected modular conveyors 102i without being powered itself.

Figure 19A:
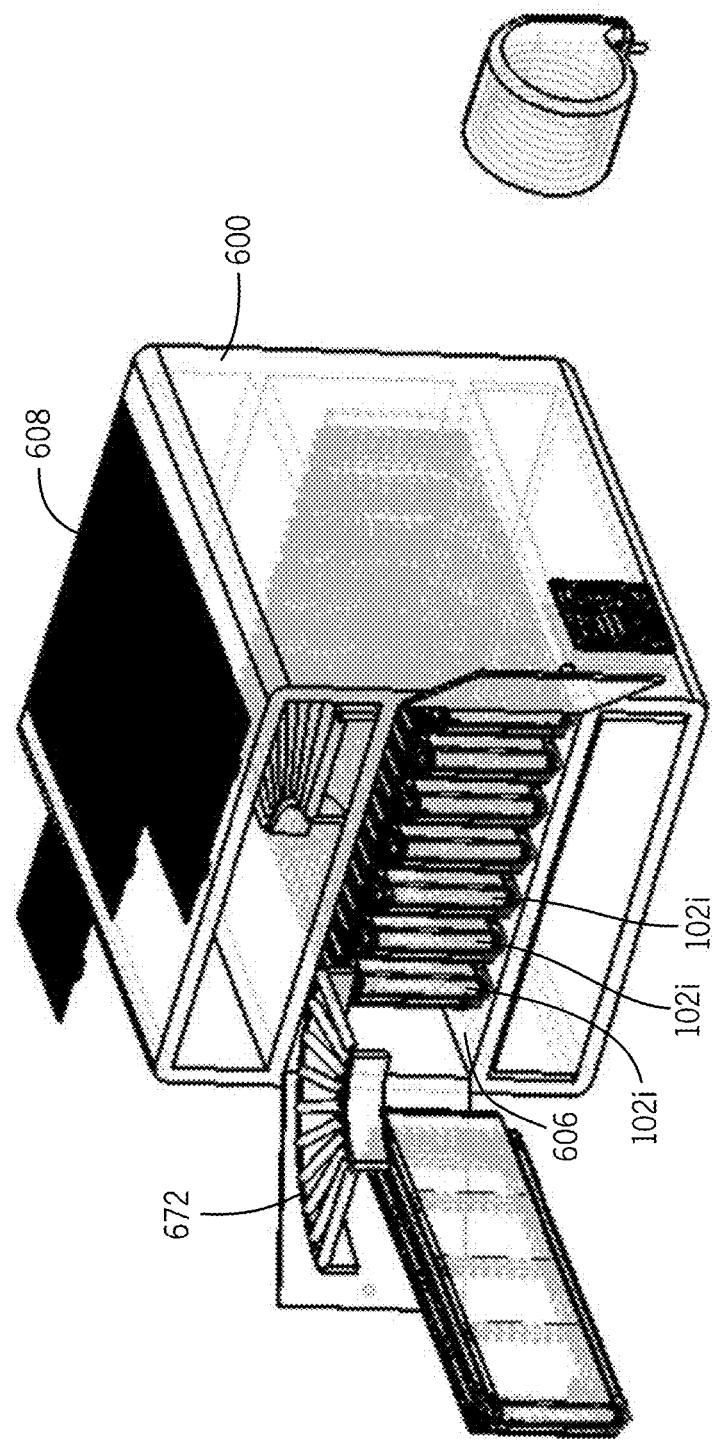
FIGS. 19A and 19B are directed to exemplary recharging stations in accordance with embodiments of the present disclosure.
Figure 19B:
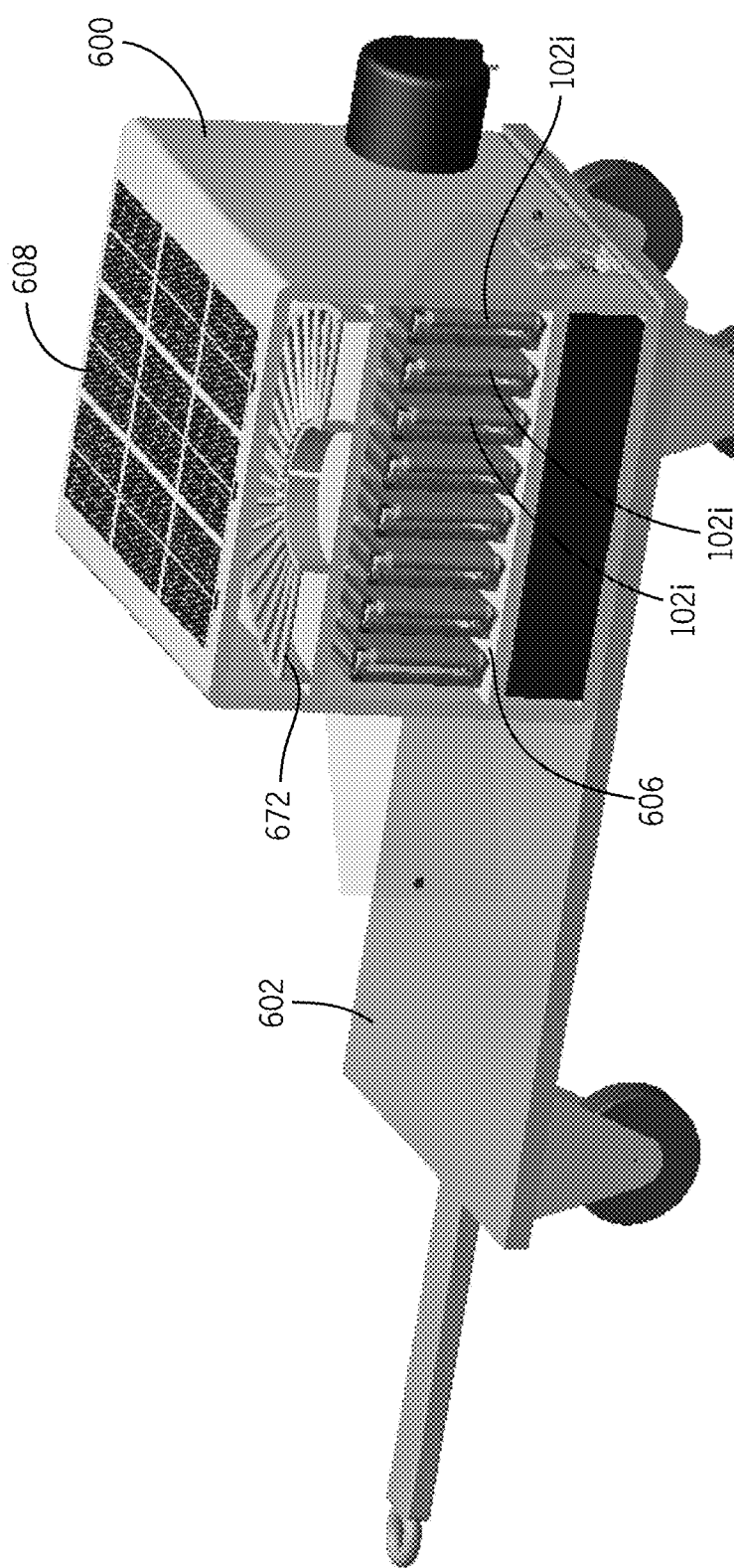

Although shown as a linking module 172 for a lateral travel path, the linking module 172 may be designed to change the direction of the travel path, for example, by being configured in a different orientation or having a curved travel path (for example, a change in direction or a 90-degree corner, see exemplary linking modules 672 in FIGS. 19A and 19B).

Methods for stacking and unstacking the conveyor assembly 100 during use will now be described with reference to FIG. 1. When configured in a stack 104, the modular conveyors 102i may be unstacked by pulling the lowest modular conveyor 102a from the bottom of the stack or by removing a modular conveyor 102g from the top of the stack and placing it in series with the other modular conveyors 102a, 102b, 102c.

As described above, the modular conveyors 102*i* may include contact bearing surfaces that allow the lowest modular conveyor in a stack 104 to be pulled from the bottom of the stack 104. Further, the modular conveyors 102*i* may be capable of self-orienting and coupling once pulled from the stack 104. Thus, as the lowest modular conveyor (i.e., the first modular conveyor 102*c*) is pulled from the stack 104, the first modular conveyor self-orients and couples to the next lowest modular conveyor in the stack (i.e., the second modular conveyor 102*b*). As the first modular conveyor 102*c* is pulled further away from the stack 104, the second modular conveyor 102*b* is pulled from the stack 104, self-orients, and couples to the next lowest modular conveyor in the stack (i.e., the third modular conveyor 102*a*), and so on, until all modular conveyors 102*i* are unstacked and coupled end-to-end.

In another suitable method of attachment, the modular conveyors 102*i* may be unstacked by removing the top modular conveyor from the stack 104 and coupling it to the lowest modular conveyor in the stack. In this method, modular conveyor 102*a* is removed from the top of the stack 104 and placed on a floor or ground surface next to or near the stack 104, then modular conveyor 102*b* is removed from the top of the stack 104 and placed on the ground surface next to modular conveyor 102*a*, then modular conveyor 102*c* is removed from the top of the stack 104 and placed on the ground surface next to modular conveyor 102*b*. Each modular conveyor may be removed from the stack 104 and coupled to the chain of modular conveyors 106, until all modular conveyors 102*i* are unstacked and coupled end-to-end.

To restack, each modular conveyor 102*i* may be uncoupled from the chain of modular conveyors 106 and placed on top of each other in a stack 104. In some embodiments, the frame 110 may further include stacking interfaces for stack-ability and/or to prevent the modular conveyors 102*i* from falling off the stack 104. For example, in one embodiment, a top surface of each frame 110 may include male stacking interfaces and a bottom surface of each frame 110 may include female stacking interfaces, or vice versa, for coupling the modular conveyors 102*i* when stacked. In another embodiment, the frame 110 may include surfaces for aligning the modular conveyors 102*i* on top of one another in the stack 104. Such surfaces may be attached to or integrally formed with the frame 110.

Referring to FIGS. 1-3, a method of setting up a conveyor assembly for loading or unloading a cargo hold of an aircraft in accordance with one embodiment of the present disclosure will now be described. Although a method of loading a cargo hold of an aircraft is described, the conveyor assemblies described herein may be used in other applications besides cargo loading of an aircraft, for example, trucks, trains, containers, and other cargo holds, factories and warehouses.

A method includes placing a first modular conveyor 102*a* on the floor of the cargo hold. The method further includes connecting a second modular conveyor 102*b* to the first modular conveyor 102*a* and pushing the first modular conveyor 102*a* forward into the cargo hold. The method further includes connecting a third modular conveyor 102*c* to the second modular conveyor 102*b* and pushing the linked first and second modular conveyors 102*a* and 102*b* forward into the cargo hold, and so on until an adequately sized conveyor system is assembled (depending on the sizing of the cargo hold). A similar process can be used to set up a conveyor assembly 100 for loading or unloading the cargo hold.

After the conveyor assembly 100 is assembled to its desired length, the individual modular conveyors 102*i* can be powered based on a control system, with speed and direction of conveyance set for the specific application. For example, in some embodiments, conveyance speed may be synchronized to be constant over the entire conveyor system. In other embodiments, speed may vary for different modular conveyors 102*i* in the conveyor system, depending, for example, on differences in loading and unloading speeds. Likewise, in a loading configuration, the direction of conveyance may be a first (e.g., forward) direction; in an unloading configuration, the direction of conveyance may be a second (e.g., reverse) direction.

After the cargo hold is fully loaded (or fully unloaded), the individual modular conveyors 102*i* can be removed from the cargo hold and restacked for reusability on a subsequent airplane. Because the individual modular conveyors 102*i* are fully separable, they can be designed to be lifted and restacked with ease by the cargo hold agents.

Figure 10:
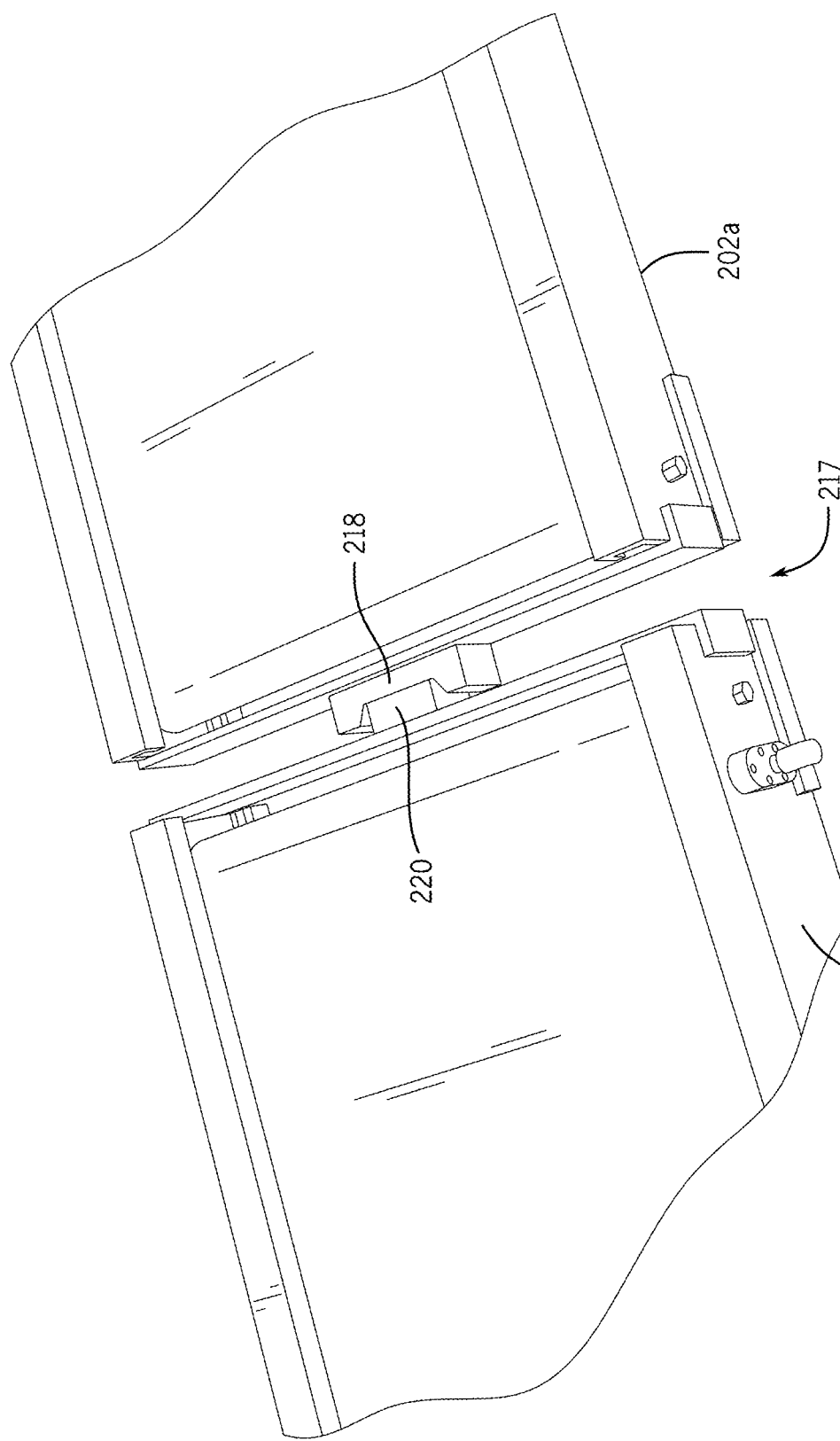
FIG. 10 is a view of an alternative attachment interface between adjacent modular conveyors in a conveyor assembly in accordance with embodiments of the present disclosure.

Referring now to FIG. 10, another embodiment of the present disclosure is provided directed to a combined lateral attachment interface 217 between modular conveyors 202*a* and 202*b* that is not rotatable like the embodiment shown in FIGS. 7-8B. The modular conveyors 202*a* and 202*b* of FIG. 10 are substantially similar to the modular conveyors 102*i* shown and described with reference to FIGS. 1-9, except for the difference in the lateral attachment interface 217. Accordingly, similar part numbers are used for this alternate embodiment, but in the 200 series. Instead of a ball and joint socket interface, the interface includes a first attachment portion 220 received within a similarly shaped second attachment portion 218, which may be a receiver or a socket.

Referring now to FIGS. 11-15, another embodiment of the present disclosure is provided directed to a modular conveyor 302*a*. The modular conveyor 302*a* of FIGS. 11-15 is substantially similar to the modular conveyor 102*a* of FIGS. 1-8B, except for differences regarding the attachment interfaces, and other features to aid with alignment and ease of use. Accordingly, similar part numbers are used for this alternate embodiment, but in the 300 series.

Figure 11:
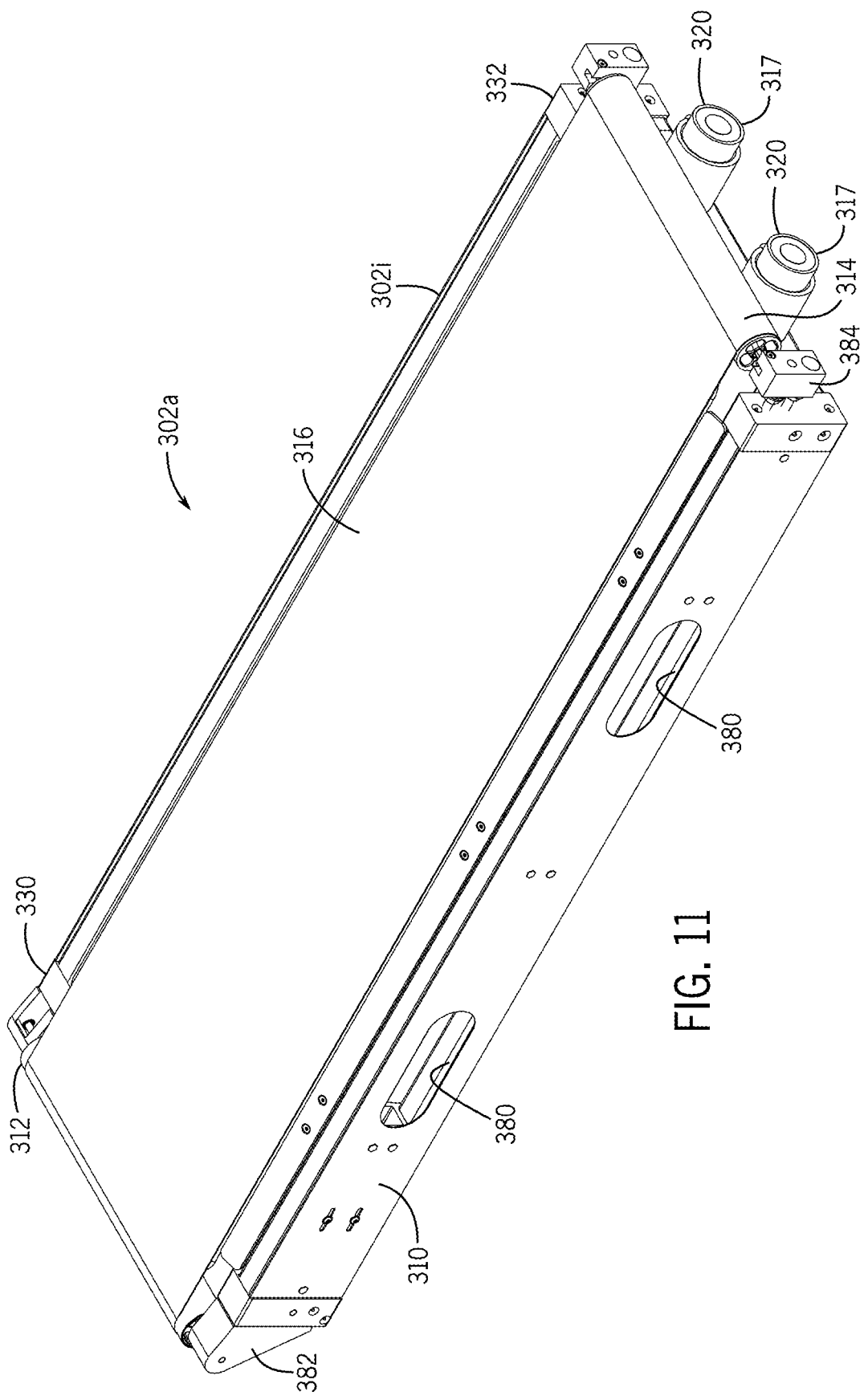
Figure 14:
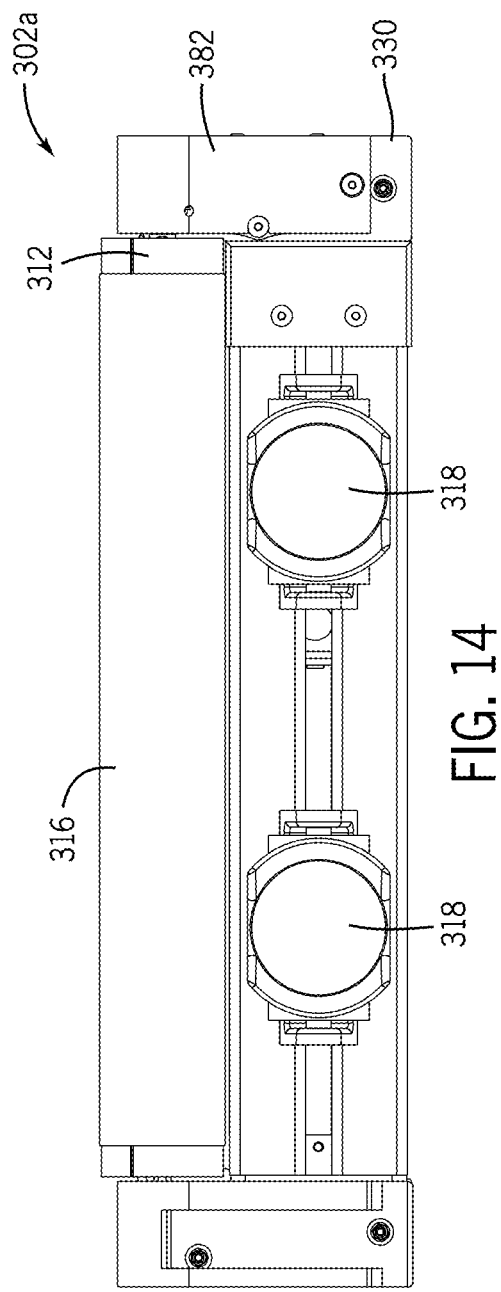
Figure 15:
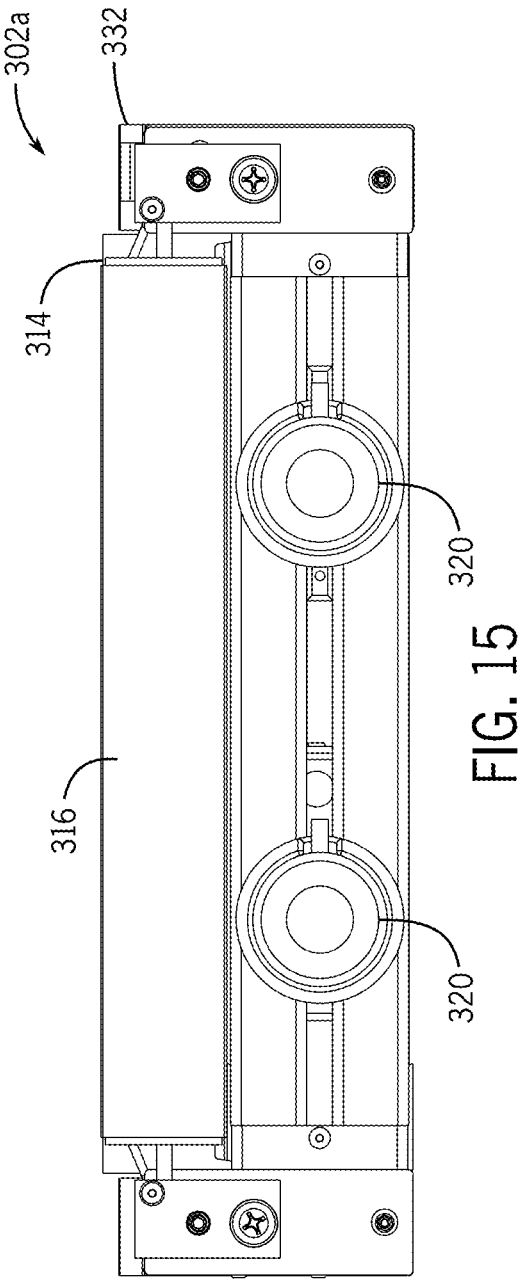

As seen in FIG. 11, the modular conveyor 302*a* of the illustrated embodiment has two attachment interfaces 318 and 320 (making up the attachment interface 317) for coupling with an adjacent modular conveyor 302*i* (not shown). The two attachment interfaces 318 and 320 can be advantageous in providing a secure attachment between adjacent conveyors 302*i* and preventing movement or rotation of adjacent conveyors 302*i* relative to each other. In the illustrated embodiment, the first and rollers 312 and 314 are positioned near the first and second ends 330 and 332 of the frame. However, they are disposed outside the frame 310 on extending couplers to provide closer end-to-end alignment between adjacent conveyor belts 316 of adjacent conveyors 302*i*. For example, at the first end 330, the first roller 312 is supported by extension brackets 382, and at the second end 332, the second roller 314 is supported by extension modular 384 (see FIGS. 11-13). Either of the extension brackets or extension modules are interchangeable and/or configured to deliver power to either of the rollers that may be drive rollers. One of the ends may also include a conveyor belt tensioning device.

The modular conveyor 302*a* further includes hand holds 380 for moving the modular conveyor 302*a* during set up or take down.

Attachment in the embodiment of FIGS. 11-15 may be by electromagnetic attachment, such that when the electromagnet is powered on, an electromagnetic field for coupling adjacent conveyors 302*i* will be activated, and when the electromagnet is powered off, the electromagnetic field coupling adjacent conveyors 302*i* will be inactivated.

Figure 17A:
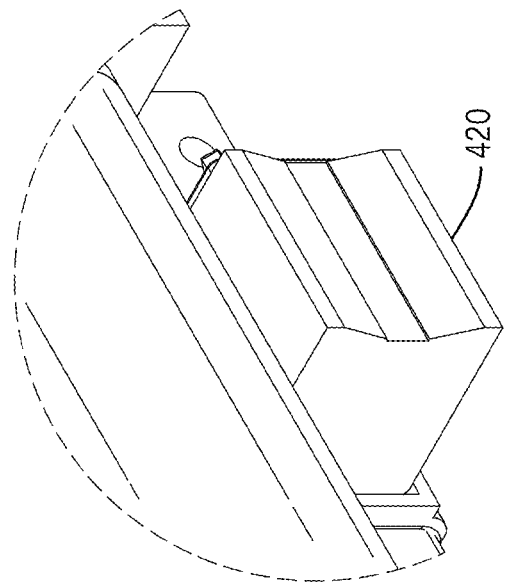
Figure 17:
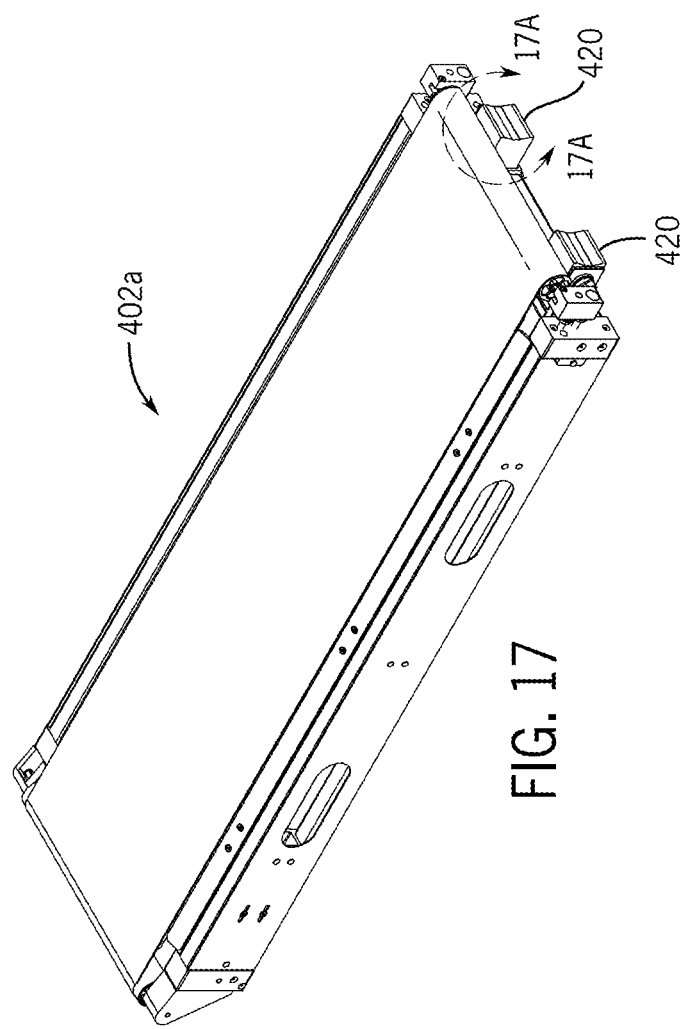
Figure 18A:
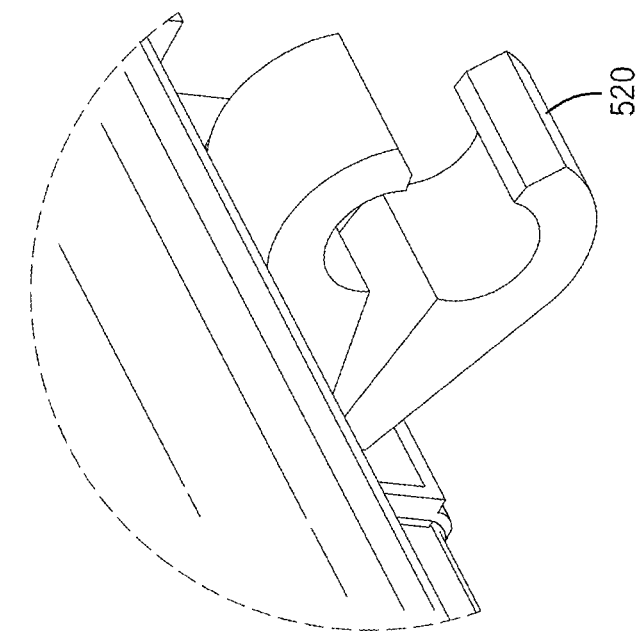
Figure 18:
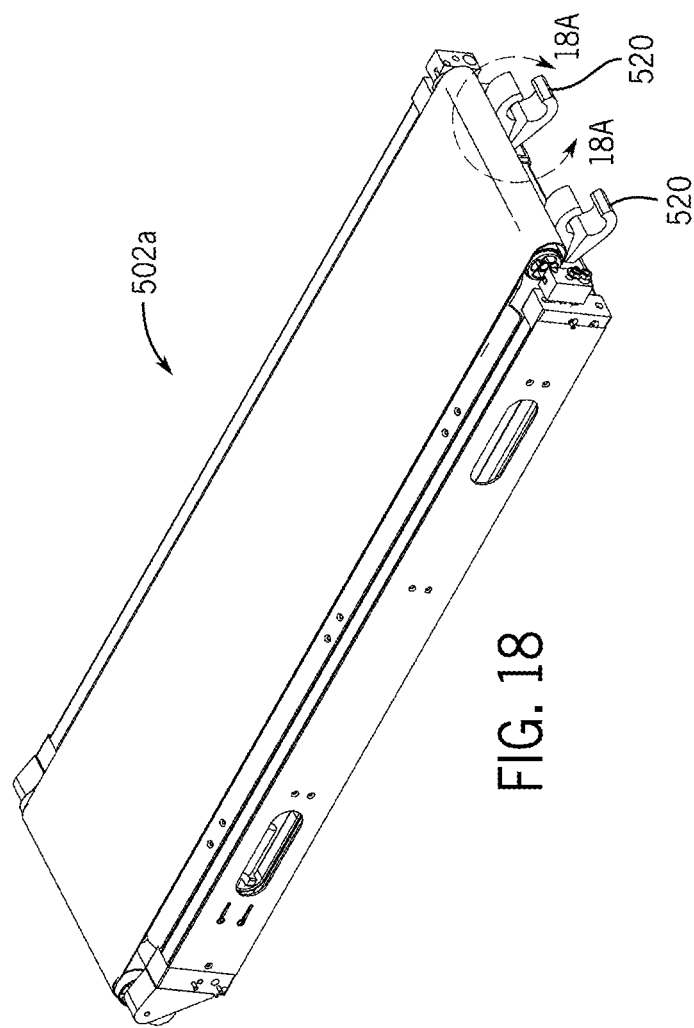

In a comparison of FIGS. 16-18, other types of attachment interfaces are within the scope of the present disclosure. For example, the attachment interfaces may be electromagnetic (FIGS. 16 and 16A), magnetic (FIGS. 17 and 17A), or mechanical (FIGS. 18 and 18A).

Referring to FIGS. 16 and 16A, an exemplary configuration of an attachment interface is provided for an electromagnetic attachment. Electromagnetic attachment is discussed above with reference to FIGS. 11-15.

Referring to FIGS. 17 and 17A, an exemplary configuration of an attachment interface is provided for a permanent magnetic attachment modular conveyor 402*a*. For permanent magnetic attachment, the connection portions are each capable of carrying a magnetic current. In the illustrated embodiment of FIG. 17, a receiver portion 420 is configured to receive a reciprocally designed receiver portion (not shown) for suitable magnetic connection and ease of release.

Referring to FIGS. 18 and 18A, an exemplary configuration of an attachment interface is provided for a mechanical attachment modular conveyor 502*a*. For mechanical attachment, a mechanically activated latch system may hold the adjacent modular conveyors together. In the illustrated embodiment of FIGS. 18 and 18A, the mechanical latch system 520 includes a clamping latch for interfacing with a receiving portion (not shown). However, other types of mechanical connections are within the scope of the present disclosure.

Referring to FIGS. 19A and 19B, when stored, the individual modular conveyors 102*i* may be stored in a collection station 600 (see FIG. 19A), which may be a recharging station, or which may be on cart 602 (see FIG. 19B) for moveability, for example, from one aircraft to another. The charging station 600 may include a storage compartment 606 for a plurality of individual modular conveyors 102*i*, and other accessories for the conveyor assembly 100 (such as linking module 672). The charging station 600 may be coupled to a power source (not shown), such as a power outlet, a battery, or a generator. In one configuration, the charging station 600 may be equipped with one or more solar panels 608 to harvest solar energy, which may be stored in a battery (not shown) associated with the recharging station 600, which can be used to recharge the batteries on the individual modular conveyors 102*i*.

Figure 20:
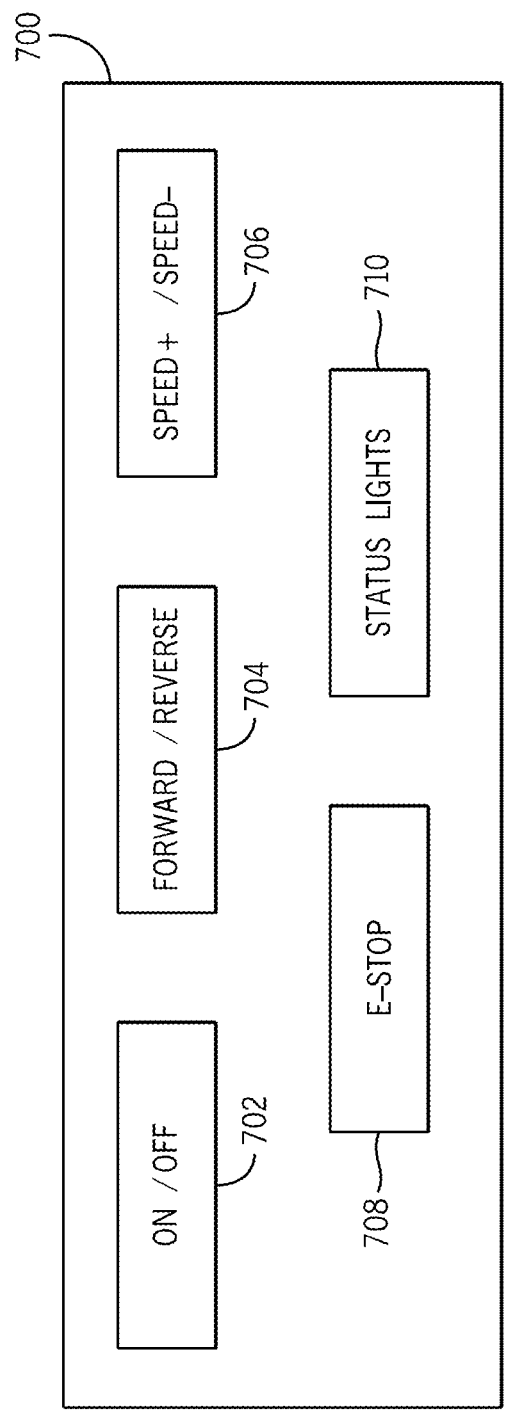
FIG. 20 is a control system for a conveyor assembly in accordance with embodiments of the present disclosure.

Referring to FIG. 20, a control system 700 for a modular conveyor is provided. The control system includes an on-off input 702, a directional input 704 for forward and reverse conveying, a speed input 706 for increased or decreased speed, and emergency stop input 708, and status indicator 710 (for example, lights that indicate conveyor status, such as on/off, forward/reverse, etc.).

For example, a series of modular conveyors 102*a*, 102*b*, 102*c* are connected in a line and turned on, as seen in FIG. 1. In some control embodiments, there is a master control of all the conveyors in the series by one of the conveyors. In this example, one of the conveyors can be set as the master. If the master is adjusted to control speed, then the other conveyors in the series can be likewise adjusted to conform to the master. If the master is subject to an emergency shut off, the other conveyors in the system can be turned off. The master may be a specific conveyor in the series, or the master may be selected from one of the conveyors in the series.

In other control embodiments, the individual conveyors may be individually controlled. In one embodiment of the present disclosure, a simple communication system and logic can be used to provide control between adjacent conveyors. In one embodiment, the communication system may be via LEDs to communicate statuses between adjacent conveyors, using for example, light color or light pulsing. For example, the communication system can be used to allow the conveyor to sequence in their assembled order. In addition, control of the individual conveyors can be executed by the conveyor itself or from another conveyor. For example, referring to FIG. 1, if loading is completed, an agent located at conveyor 102*a* may want to turn off conveyors 102*b* and 102*c* by executing one command at conveyor 102*a*.

As used herein, the terms "about", "substantially", and "approximately," in reference to a number, is used herein to include numbers that fall within a range of 10%, 5%, or 1% in either direction (greater than or less than) the number unless otherwise stated or otherwise evident from the context (except where such number would exceed 100% of a possible value).

While preferred embodiments of the present invention have been shown and described herein, it will be apparent to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of some of the embodiments of the present disclosure and that methods and structures within the scope of these claims and their equivalents be covered thereby.

What is claimed is:

1. A conveyor assembly for conveying objects, the conveyor assembly comprising:
   a first modular conveyor having a first frame extending between a first end and a second end and defining an interior void, a first closed conveyor belt disposed between a first roller and a second roller, wherein the first roller is disposed within the interior void proximate to the first end and the second roller is disposed within the interior void proximate to the second end and a first connecting interface at the first end of the first modular conveyor;
   the first modular conveyor further comprises a first control system to receive an input and, in response to the input, operate a first motor;
   the first modular conveyor further comprises the first motor configured to drive at least one of the first roller and the second roller; and
   wherein the first modular conveyor further comprises a second connecting interface located at the second end; and
   wherein each of the first connecting interface of the first modular conveyor and the second connecting interface of the first modular conveyor are each configured to be removably coupled to one of a first connecting interface of a second modular conveyor or the second connecting interface of the second modular conveyor;
   wherein the first modular conveyor, when coupled to the second modular conveyor, receives the input that comprises a user input to the first modular conveyor, and the first control system forwards the input, via the first connecting interface coupled to a second connecting interface of the second modular conveyor, to a second control system of the second modular conveyor and wherein the second control system of the second modular conveyor self-orients to operate a second closed conveyor belt of the second modular conveyor in a common direction with the first closed conveyor belt; and wherein the first modular conveyor, when coupled to the second modular conveyor, receives, via the first connecting interface coupled to one of the second connecting interface of the second modular conveyor or the first connecting interface of the second modular conveyor, the input comprising an output from the second control system of the second modular conveyor and operates the first closed conveyor belt in a common direction with the second closed conveyor belt.

2. The conveyor assembly of claim 1, wherein the first connecting interface and the second connecting interface comprise magnetic, electromagnetic, or mechanical connecting interfaces.

3. The conveyor assembly of claim 1, wherein the first connecting interface and the second connecting interface, when connected, provide spacing between adjacent the first modular conveyor and the second modular conveyor to allow for continuous conveying of an object between the second end of the first modular conveyor and the first end of the second modular conveyor.

4. The conveyor assembly of claim 1, further comprising a common electrical control of each of the first modular conveyor and the second modular conveyor when the first modular conveyor and the second modular conveyor are connected.

5. The conveyor assembly of claim 1, wherein the conveyor assembly includes at least one battery disposed within the interior void and providing electrical power to the first motor.

6. The conveyor assembly of claim 1, wherein at least one of the first connecting interface and the second connecting interface include a connecting interface selected from the group consisting of a ball and joint socket, a mechanical clamp, and a receiving portion and a received portion.

7. The conveyor assembly of claim 1, wherein at least one of the first connecting interface and the second connecting interface allow for an angled connection such that the second modular conveyor may be angled up to 10, 20, 30, or 45 degrees off the conveying axis of the first modular conveyor.

8. The conveyor assembly of claim 7, wherein the angled connection is in the same plane or in a different plane.

9. The conveyor assembly of claim 1, wherein a support surface of each of the first modular conveyor and the second modular conveyor includes bearings or bearing surfaces.

10. The conveyor assembly of claim 1, wherein at least one of the first modular conveyor and the second modular conveyor, when unconnected, are configured to be stackable.

11. The conveyor assembly of claim 1, wherein at least one of the first modular conveyor and the second modular conveyor are controlled by a master controller located on one of the first modular conveyor and the second modular conveyor.

12. The conveyor assembly of claim 1, wherein the first modular conveyor and the second modular conveyor are adjacent to one another.

13. The conveyor assembly of claim 1, wherein the first modular conveyor and the second modular conveyor are separated by a linking unit.

14. A method of conveying objects, the method comprising:
obtaining a first modular conveyor having a first frame extending between a first end and a second end and defining an interior void, and a first closed conveyor belt disposed between a first roller and a second roller, wherein the first roller is disposed within the interior void proximate to the first end and the second roller is disposed within the interior void proximate to the second end and a first connecting interface at the first end of the first modular conveyor, and wherein the first modular conveyor further comprises a first control system to receive an input and, in response to the input, operate a first motor, and the first modular conveyor further comprises the first motor configured to drive at least one of the first roller and the second roller;

releasably coupling one of the first connecting interface located at the first end and a second connecting interface located at the second end with one of a first connecting interface located at the first end of a second modular conveyor or a second connecting interface located at the second end of the second modular conveyor;

when coupled to the second modular conveyor, receiving the input comprises receiving a user input to the first modular conveyor, and forwarding the input from the first control system, via the first connecting interface coupled to the second connecting interface of the second modular conveyor, to a second control system of the second modular conveyor, and wherein the second control system of the second modular conveyor self-orients to operate a second closed conveyor belt of the second modular conveyor in a common direction with the first closed conveyor belt; and wherein receiving the input comprises receiving an output from the second control system of the second modular conveyor and operates the first closed conveyor belt in a common direction with the second closed conveyor belt.

15. The method of claim 14, further comprising disconnecting the first connecting interface at the first end of the first modular conveyor from the second connecting interface at the second end of the second modular conveyor, and assembling the first modular conveyor and the second modular conveyor for storage.

16. The method of claim 14, wherein the connection between the first connecting interface and the second connecting interface of the first modular conveyor and the second modular conveyor comprises a magnetic, electromagnetic, or mechanical connection.

17. The method of claim 16, further comprising controlling the first control system and the second control system by a master controller located on one of the first modular conveyor and the second modular conveyor.

18. A first modular conveyor, comprising:
a first frame extending between a first end and a second end and defining an interior void, wherein a first closed conveyor belt is disposed between a first roller and a second roller, and wherein the first roller is disposed within the interior void proximate to the first end and the second roller is disposed within the interior void proximate to the second end and a first connecting interface at the first end of the first modular conveyor;

the first modular conveyor further comprises a first control system to receive an input and, in response to the input, operate a first motor;

the first modular conveyor further comprises the first motor configured to drive at least one of the first roller and the second roller; and wherein the first modular conveyor further comprises a second connecting interface located at the second end; and wherein each of the first connecting interface of the first modular conveyor and the second connecting interface of the first modular conveyor are each configured be removably coupled to one of a first connecting interface of a second modular conveyor or the second connecting interface of the second modular conveyor;

wherein the first modular conveyor, when coupled to the second modular conveyor, receives the input that comprises a user input to the first modular conveyor, and the first control system forwards the input, via a wireless connection between the first connecting interface coupled to a second connecting interface of the second modular conveyor, to a second control system of the second modular conveyor and wherein the second control system of the second modular conveyor self-orients to operate a second closed conveyor belt of the second modular conveyor in a common direction with the first closed conveyor belt; and wherein the first modular conveyor, when coupled to one of the second modular conveyor, receives, via the wireless connection between the first connecting interface coupled to the second connecting interface of the second modular conveyor or the first connecting interface of the second modular conveyor, the input comprising an output from the second control system of the second modular conveyor and operates the first closed conveyor belt in a common direction with the second closed conveyor belt.

19. The first modular conveyor of claim 18, wherein the wireless connection comprises an infrared connection.

20. The first modular conveyor of claim 18, wherein the wireless connection comprises a radio frequency connection.

21. The first modular conveyor of claim 18, wherein decoupling the second modular conveyor disables the wireless connection.

* * * * *